US010691833B2

(12) United States Patent
Karnik

(10) Patent No.: US 10,691,833 B2
(45) Date of Patent: Jun. 23, 2020

(54) METHOD AND AN APPARATUS FOR ACTIVATING A PREDETERMINED FUNCTION

(71) Applicant: MasterCard International Incorporated, Purchase, NY (US)

(72) Inventor: Ajit Karnik, Pune (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 90 days.

(21) Appl. No.: 15/785,670

(22) Filed: Oct. 17, 2017

(65) Prior Publication Data

US 2018/0121668 A1 May 3, 2018

(30) Foreign Application Priority Data

Nov. 3, 2016 (SG) .......................... 10201609214R

(51) Int. Cl.
| *G06F 21/00* | (2013.01) |
| *G06F 21/62* | (2013.01) |
| *G06F 3/041* | (2006.01) |
| *G06F 21/31* | (2013.01) |
| *G06F 21/74* | (2013.01) |
| *G06F 3/0488* | (2013.01) |

(52) U.S. Cl.
CPC .......... *G06F 21/629* (2013.01); *G06F 3/0416* (2013.01); *G06F 3/04883* (2013.01); *G06F 21/31* (2013.01); *G06F 21/74* (2013.01); *G06F 2203/04808* (2013.01)

(58) Field of Classification Search
CPC ........ G06F 21/31; G06F 21/629; G06F 21/74; G06F 3/0416; G06F 3/04883; G06F 3/04886; G06F 2203/04808

USPC ......................................................... 726/19
See application file for complete search history.

(56) References Cited

U.S. PATENT DOCUMENTS

| 9,430,634 | B1* | 8/2016 | Dotan .................... H04L 63/083 |
| 2002/0144158 | A1* | 10/2002 | Hekimian ............... G06F 21/31 726/5 |
| 2004/0243855 | A1* | 12/2004 | Plagne .................... G06F 21/83 726/4 |
| 2005/0182973 | A1* | 8/2005 | Funahashi ............... G06F 21/34 726/19 |
| 2007/0250920 | A1* | 10/2007 | Lindsay .................. G06F 21/31 726/7 |

(Continued)

FOREIGN PATENT DOCUMENTS

WO  WO-2014178039 A1 * 11/2014 ........... G06F 3/0488

OTHER PUBLICATIONS

NPL Search Results (Year: 2020).*

*Primary Examiner* — Syed A Zaidi
(74) *Attorney, Agent, or Firm* — Buckley, Maschoff & Talwalker LLC

(57) ABSTRACT

Disclosed is a computer-implemented method for activating a predetermined function in a device. The device in question has at least a touch-screen coupled to a processor, and is operable in a data entry mode and a command mode, the data entry mode being one in which the processor is configured to receive inputs detected at the touch-screen and the command mode being one in which the processor is configured to activate a function.

25 Claims, 10 Drawing Sheets

(56) References Cited

U.S. PATENT DOCUMENTS

| | | | |
|---|---|---|---|
| 2008/0040616 A1* | 2/2008 | Sato | G06K 9/00013 713/186 |
| 2011/0260829 A1* | 10/2011 | Lee | G06F 3/0414 340/5.51 |
| 2013/0276103 A1* | 10/2013 | Rautenbach | G06F 21/34 726/19 |
| 2015/0089634 A1* | 3/2015 | DeLuca | G06F 3/0488 726/19 |
| 2016/0034901 A1* | 2/2016 | Ferren | G02B 13/0065 705/44 |
| 2016/0171281 A1* | 6/2016 | Park | G06F 1/1643 382/124 |
| 2017/0124313 A1* | 5/2017 | Mann | G06F 21/32 |

* cited by examiner

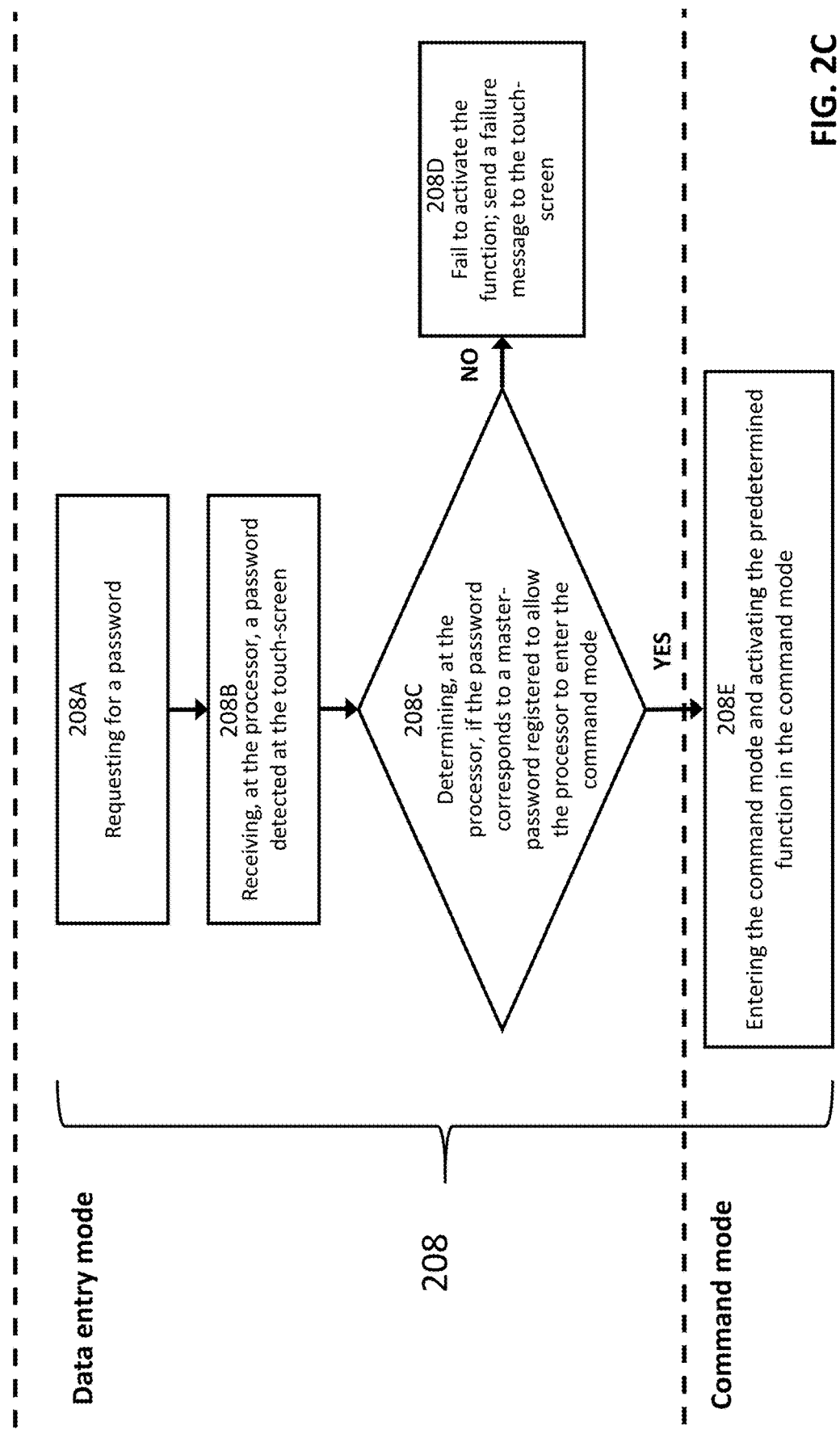

METHOD AND AN APPARATUS FOR ACTIVATING A PREDETERMINED FUNCTION

CROSS-REFERENCE TO RELATED APPLICATION

This application is a U.S. National Stage filing under 35 U.S.C. § 119, based on and claiming benefit of and priority to SG Patent Application No. 10201609214R filed Nov. 3, 2016.

TECHNICAL FIELD

The present disclosure relates to a method and an apparatus for activating a predetermined function in a device.

BACKGROUND

With advent of the digital age, use of digital media and devices is ubiquitous in modern societies across people of all ages. Digital media and devices have infiltrated into all parts of our lives—from digital entertainment, professional & amateur work, travels, online purchases to financial services, we are relying on digital devices much more than we used to be. A type of digital device which we rely upon and use extensively is a mobile device. This includes a tablet, a laptop and a mobile phone. According to Statista.com, there are currently 4.61 billion mobile phone users worldwide. That is, more than one in every two persons own a mobile phone globally.

A necessary consequence of our heavy dependence on digital devices is that an enormous amount of potentially sensitive and confidential information such as contact details, messages, emails, bank details, digital wallets, tax details, insurance details, medical information etc. is being stored online or in digital storage since such information is often required to carry out transactions and/or run applications online successfully. This leads to a flourishing area of digital security where entry barriers are raised to allow use of this privileged information only to selected and appropriately authorized individuals. Typical entry barriers are in the form of PINs, passwords, patterns and biometrics such as iris scans and fingerprints. However, none of these security hurdles is very secure as fraudsters are often able to breach them surreptitiously by key-logging, by learning the patterns through observation, by tracing smudges left on touch screens, by copying fingerprints, or by duplicating iris scans.

In view of the above, it would be desirable to provide a method and an apparatus allowing users to access their digital devices or information with added security, which overcomes one or more of the above disadvantages, or which at least provides a useful alternative. Moreover, the method and apparatus also facilitate faster and easier access to applications and special functions in mobile devices.

Furthermore, other desirable features and characteristics will become apparent from the subsequent detailed description and the appended claims, taken in conjunction with the accompanying drawings and this background of the disclosure.

SUMMARY

Disclosed herein is a computer-implemented method for activating a predetermined function in a device, the device having at least a touch-screen coupled to a processor, the device being operable in a data entry mode and a command mode, the data entry mode being one in which the processor is configured to receive inputs detected at the touch-screen and the command mode being one in which the processor is configured to activate a function, the method comprising:

in the data entry mode,
  receiving, at the processor, a first input that is detected at the touch-screen;
  determining, at the processor, if a second input is received within a predetermined waiting time period, the predetermined waiting time period being a duration during which the second input is to be received, each of the first and second inputs having a first and second execution time periods and a position relative to the other input, the first and second execution time periods being the time taken to execute the first and second inputs, respectively;
  determining, at the processor, if the first and second inputs correspond to a sequence of movements registered for the predetermined function based on the first and second execution time periods and the relative position between the first and second inputs when it is determined that the second input is received within the predetermined waiting time period; and
entering the command mode when it is determined that the first and second inputs correspond to the sequence of movements registered for the predetermined function, wherein the predetermined function is activated in the command mode.

Also disclosed herein is an apparatus for activating a predetermined function, the apparatus comprising:
  at least one processor;
  at least a touch-screen coupled to the at least one processor; and
  at least one memory including computer program code;
  the apparatus being operable in a data entry mode and a command mode, the data entry mode being one in which the processor is configured to receive inputs detected at the touch-screen and the command mode being one in which the processor is configured to activate a function, the at least one memory and the computer program code configured to, with at least one processor, causes the apparatus at least to:
in the data entry mode,
  receive, at the processor, a first input that is detected at the touch-screen;
  determine, at the processor, if a second input is received within a predetermined waiting time period, the predetermined waiting time period being a duration during which the second input is to be received, each of the first and second inputs having a first and second execution time periods and a position relative to the other input, the first and second execution time periods being the time taken to execute the first and second inputs, respectively;
  determine, at the processor, if the first and second inputs correspond to a sequence of movements registered for the predetermined function based on the first and second execution time periods and the relative position between the first and second inputs when it is determined that the second input is received within the predetermined waiting time period; and
  enter the command mode when it is determined that the first and second inputs correspond to the sequence of movements registered for the predetermined function, wherein the predetermined function is activated in the command mode.

BRIEF DESCRIPTION OF THE DRAWINGS

The accompanying figures, where like reference numerals refer to identical or functionally similar elements throughout the separate views and which together with the detailed description below are incorporated in and form part of the specification, serve to illustrate various embodiments, by way of example only, and to explain various principles and advantages in accordance with a present embodiment.

FIG. 2, comprising FIG. 2A, FIG. 2B and FIG. 2C, depicts a flow chart for activating a predetermined function in a device, wherein FIG. 2A depicts the steps of receiving a first input that is detected at the touch-screen, determining if a second input is received within a predetermined waiting time period, determining if the first and second inputs correspond to a sequence of movements registered for the predetermined function, and entering a command mode when it is determined that the first and second inputs correspond to the sequence of movements registered for the predetermined function, wherein the predetermined function is activated in the command mode in accordance with a first embodiment; FIG. 2B depicts various embodiments for the step of determining if the first and second inputs correspond to a sequence of movements registered for the predetermined function token; and FIG. 2C depicts an alternative embodiment for activating a predetermined function in a device when it is determined that the first and second inputs do not correspond to the sequence of movements registered for the predetermined function, comprising the steps of requesting for a password when it is determined that the first and second inputs do not correspond to the sequence of movements, receiving the password that is detected at the touch-screen, determining if the password corresponds to a master password registered to allow the processor to enter the command mode and entering the command mode when it is determined that the password corresponds to the master password, wherein the predetermined function is activated in the command mode.

FIG. 5, comprising FIGS. 5A to 5F, depicts illustrations of a device 100, wherein FIGS. 5A and 5B depicts examples of a gesture input at a touch-screen 102 in their absolute coordinates with respect to a reference point on the touch-screen 102; and FIGS. 5C to 5F depicts different orientations of the device 100.

FIG. 6, comprising FIGS. 6A to 6C, depicts illustrations of inputs detected at the touch-screen 102 and received by the processor 104 of the device 100 as a time domain signal, wherein FIG. 6A depicts a representation of a short tap detected at a touch-screen 102 with an execution time period of T1; FIG. 6B depicts a relatively longer tap detected at the touch-screen 102, in comparison with the short tap as illustrated earlier in FIG. 6A, with an execution time period of T2; and FIG. 6C depicts a sequence of inputs comprising two short taps and one long tap detected at the touch-screen 102.

FIG. 7, comprising FIGS. 7A to 7C, depicts illustrations of a rendering on a touch-screen 102 after a sequence of inputs has been detected at the touch-screen 102, wherein FIG. 7A depicts the sequence of inputs detected at the touch-screen 102; FIG. 7B depicts the sequence of inputs detected at the touch-screen 102 smudged with no outline; and FIG. 7C depicts the sequence of inputs detected at the touch-screen 102 with some outlines still visible.

FIG. 8, comprising FIGS. 8A and 8B, depicts illustrations of a sequence of inputs detected at the touch-screen 102 and received by the processor 104 of the device 100 as a time domain signal, wherein FIG. 8A depicts the sequence of inputs detected at the touch-screen 102; and FIG. 8B depicts the time domain signal corresponding to the sequence of inputs in FIG. 8A.

DETAILED DESCRIPTION

Figure 1:
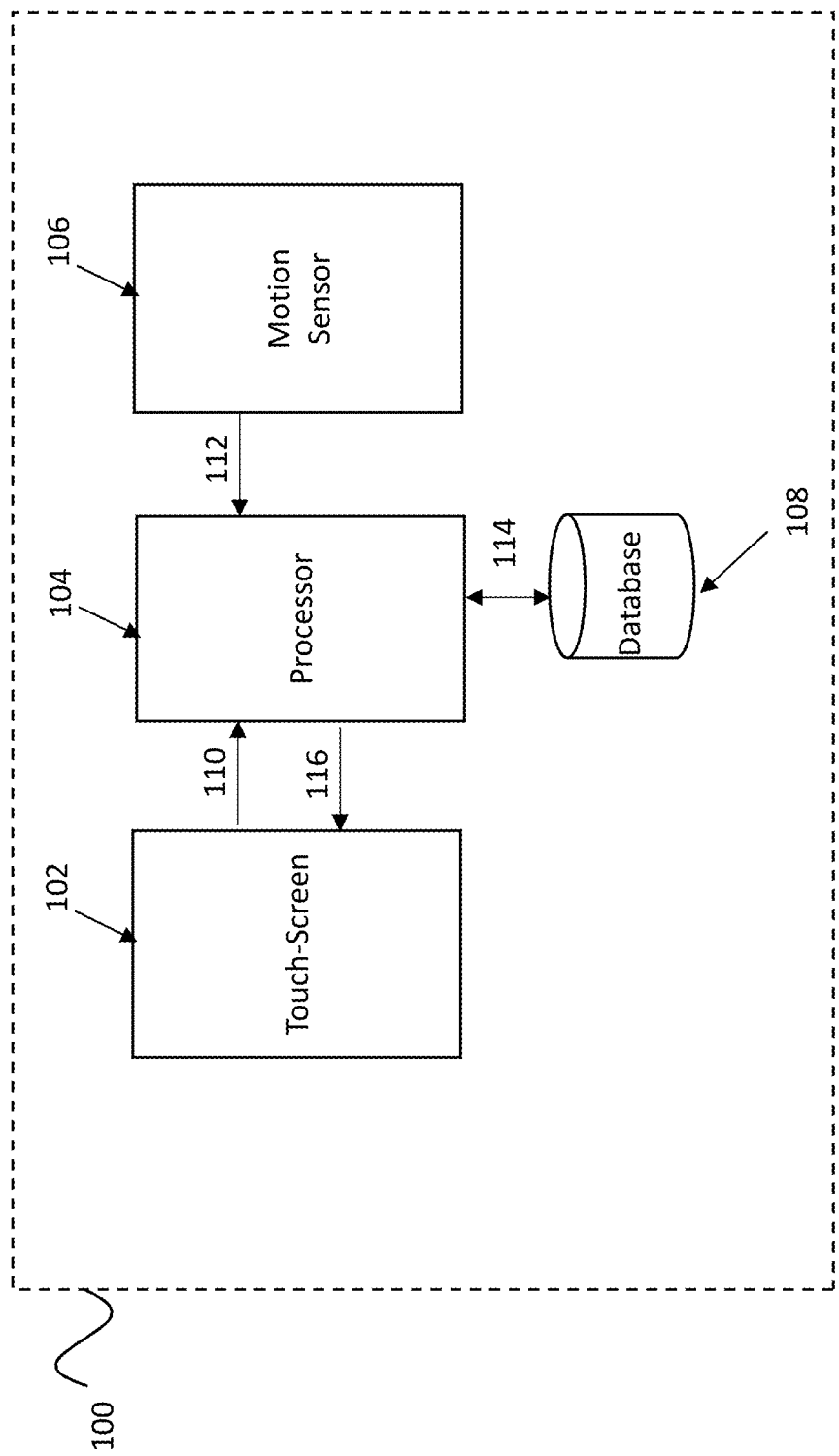
FIG. 1 depicts a block diagram of a system for activating a predetermined function in accordance with a first embodiment.

Various embodiments of the present invention will be described, by way of example only, with reference to the drawings. Like reference numerals and characters in the drawings refer to like elements or equivalents.

[The following italicised paragraphs are standard paragraphs that we have for computer-related inventions. You need not review them closely if you wish.]

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "determining", "requesting", "receiving", "entering", "receiving", "waiting", "identifying", "activating" or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses an apparatus for performing the operations of the methods. Such apparatus may be specially constructed for the required purposes, or may comprise a computer or other device selectively activated or reconfigured by a computer program stored in the computer. The algorithms and displays presented herein are not inherently related to any particular computer or other apparatus. Various machines may be used with programs in accordance with the teachings herein. Alternatively, the construction of a more specialized apparatus to perform the required method steps may be appropriate. The structure of a computer will be shown in the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a computer. The computer readable medium may also include a hard-wired medium such as exemplified in the Internet system, or wireless medium such as exemplified in the GSM mobile telephone system. The computer program when loaded and executed on such a computer effectively results in an apparatus that implements the steps of the preferred method.

Various embodiments relate to a method and an apparatus for activating a predetermined function in a device. In various embodiments, the device is a mobile device, typically a mobile phone with a touch-screen. In an embodiment, the method for activating the predetermined function in the device comprises at least a first input and a second input, where the first input can be detected at the touch-screen of the device and the second input can be detected at the touch-screen or a motion sensor of the device. The touch-screen of the device is normally layered on top of an electronic visual display of the device and is configured to detect inputs from a user of the device. The user may enter the inputs through one or more simple or multi-touch gestures by touching the touch-screen with a special stylus and/or one or more fingers. The motion sensor of the device, on the other hand, is configured to detect inputs from a user of the device through shaking or displacement of the device. A displacement of the device can be understood as any action done on the device to move it from its original location and/or orientation.

In the following description, the predetermined function is activated in the device by inputting at least one input at the device. It will be appreciated that the term "input" can be variably used to describe a single "movement" or "gesture" (e.g. a tap, top-to-bottom swipe along the touchscreen etc) or a combination of "movements" or "gestures" (e.g. a tap followed by a left-to-right swipe, followed by a top-to-bottom swipe etc). In various embodiments, the inputs may function as a password. In this case, the longer the combination of gestures, the more secure the password. The method for activating the predetermined function in the device includes comparing if the at least one input corresponds to a registered sequence of movements for activating the predetermined function in the device. It will be appreciated that the term "registered" may be considered as "pre-recoded" or "saved" etc. This denotes that the sequence of movements have been recorded or registered in a database of the device, to facilitate comparison between the registered input or sequence of movements against an input or sequence of movements subsequently performed using the device. In an embodiment, at least one input is received at a processor of the device when the processor is in a data entry mode, the data entry mode being one in which the processor is configured to receive inputs, while the function in the device is activated when the processor of the device is in a command mode, the command mode being one in which the processor is configured to activate the function. In other words, the processor of the device is being configured to receive inputs in the data entry mode and to activate a function in the command mode. In an embodiment, the processor of the device may wait for a predetermined period of time after the first input is received to receive a second input detected at the device. The predetermined period of time can be set by a user of the device or it can be a predetermined period of time in the processor predefined by a third party (e.g. a manufacturer, application, or a facilitator of payment). In another embodiment, the processor of the device may wait for the second input indefinitely until the second and subsequent input is received at the device.

In an embodiment, the user of the device is an owner of the device. The owner of the device is a person who has the right to the device. In another embodiment, the user of the device may not be the owner of the device. For example, the owner may reveal sequences of movements registered to predetermined functions in the device to another user of the device so that the other user can use the device in the owner's absence. Accordingly, the owner may selectively reveal sequences of movements registered to predetermined functions in the device which may not include sensitive personal information of the owner. For example, the owner may reveal to another user (e.g. his or her spouse) the sequence of movement registered for activating a predetermined function (e.g. a camera function or a call function in the device). This advantageously provides a way for the device to become a multi-user device where individual accounts may be set up for each user of the device. For example, each member sharing the device may be able to access his or her individual account using an unique sequence of movements, while the individual accounts remain separated such that each member may not view the information in an account held by a different user and registered on the device. In other embodiments, the user (or potential user) of the device may be a person who picked up the device by chance and has no authorized access to any functions in the device. In this case, the user would not have access to any of the functions in the device since the user does not know the sequence of movements to any predetermined function in the device. Therefore, in specific embodiments, the user of the device activates a predetermined function in the device when he/she has entered a specific sequence of inputs into the device which corresponds to a registered sequence of movements stored in the device for activating the predetermined function. In various embodiments, the predetermined function can be any function or application which can be supported by the device. Examples of a predetermined function include activate a call, send a message or an email, unlock the device, carry out a transaction using the device etc.

FIG. 1 illustrates a block diagram of a device 100 within which a predetermined function can be activated.

The device 100 comprises a touch-screen 102, a processor 104, a motion sensor 106 and a database 108. In the device 100, the touch-screen 102, the motion sensor 106 and the database 108 are in communication with the processor 104. In an embodiment, the processor 104 receives at least one input 110 from the touch-screen 102. In another embodiment, the processor 104 receives at least one input 112 from the motion sensor 106. In an embodiment, the processor 104 is configured to communicate with the database 108 to receive data stored in the database 108. In another embodiment, the processor 104 is configured to retrieve data that is stored in the database 108 and/or to send data to be stored in the database 108.

The device 100 typically is associated with a user of the device who desires to activate a predetermined function in the device. The device 100 may be a fixed (wired) computing device or a wireless (portable) computing device. In specific implementations, the device 100 may be a handheld or portable or mobile device carried or used by the user, or may refer to other types of electronic devices such as a personal computer or an interactive voice response (IVR) system and the like. The mobile device may be a device, such as a mobile phone, a laptop computer, a personal digital computer (PDA), a mobile computer, a portable music player (such as an iPod™ and the like).

The touch-screen 102 is typically used to detect inputs 110 from a user of the device. The touch-screen 102 may be an input device of a digital or an analog nature. It can be understood that analog technologies generally measure a change in the value of a signal, such as a voltage, while digital technologies rely on a binary choice between the presence and absence of a signal. The touch-screen 102 may involve a resistive or a capacitive technology or the like as long as the at least one input 110 can be received from the user of the device through a touch or a gesture detected on the touch-screen 102.

The processor 104 is typically a central processing unit contained on a single integrated circuit (IC). The processor 104 comprises one or multiple application-specific instruction set processor which is a component used in system-on-a-chip design; a graphics processing unit (GPU) designed for doing dedicated graphics-rendering computations; a physics processing unit (PPU) dedicated to handle the calculations of physics; a digital signal processor (DSP) designed specifically for digital signal processing; an image processor used for image processing; a crypto processing engine for encryption, decryption, computation of hash, generation of session keys, and related functions; and a network targeted at the networking application domain. In an embodiment, the processor 104 can be an information processor which takes information in one form and processes it into another form. In an embodiment, the at least one input 110, 112 is received at the processor 104 of the device 100 when the processor 104 is in a data entry mode, the data entry mode being one in which the processor 104 is configured to receive inputs. Alternatively, a predetermined function can be activated in the device 100 when the processor 104 of the device 100 is in a command mode, the command mode being one in which the processor 104 is configured to activate the function. In a preferred embodiment, the processor 104 receives at least one input from the user of the device 100, processes the at least one input to determine if the at least one input corresponds to a registered sequence of movements 114 associated with a predetermined function in the device, and activate the predetermined function in the device when it is determined that the at least one input corresponds to the registered sequence of movements. In various embodiments, the processor 104 is configured to enhance the quality of inputs by removing any background noise which may be present, using signal processing. This advantageously aids in identifying the inputs received at the processor 104 and comparing these inputs to the registered sequence of movements 114 associated with the predetermined function.

The motion sensor 106 is typically used to detect three-dimensional motions and is used for motion processing. In an embodiment, the motion sensor 106 includes accelerometers, gyroscopes, compasses and barometers. In an embodiment, the motion sensor 106 can be used to measure a linear acceleration and a tilt angle, and to effectively detect a rotation from a vertical to a horizontal state with respect to an initial location and orientation. Moreover, in an embodiment, the motion sensor 106 can also be used to measure the angular rate of rotational movement about one or more axes and complex motion accurately in multiple dimensions, thereby precisely tracking the position and rotation of a moving object. In a preferred embodiment, the motion sensor 106 is able to detect and measure full gestures and movements such as change in orientation from the user and use them as inputs 112 for further processing by the processor 104.

The processor 104 may be configured to communicate with a database 108. The database 108 stores user data, which includes user details, email addresses, contact numbers, applications, music, photographs, personal documents, payment card details, transaction details, passwords and security codes. In a preferred embodiment, the database 108 also stores at least a registered sequence of movements 114 associated with a predetermined function in the device 100. In an embodiment, the registered sequence of movements 114 is set (or predetermined) by the user and is unique for the predetermined function in the device 100. In various embodiments, the sequence of movements 114 can be registered for the predetermined function in the device 100 when the device 100 is in the data entry mode. For example, to register a sequence of movements 114 for a predetermined function in the device 100, the user may activate the data entry mode of the device 100 when the user has full access to all the functionalities of the device 100. The user may then input a sequence of inputs 110, 112 and register these inputs 110, 112 as the sequence of movements 114 for a predetermined function in the device 100. In an embodiment, the database 108 also stores a master password which is registered for a predetermined function in the device 100. All sensitive data such as sequence of gestures, PINs & Passwords are stored securely using crypto functions thereby making it extremely difficult for any unauthorised user from getting access to them. In various embodiments when the processor 104 determines that the at least one input 110, 112 received at the processor 104 do not correspond to the sequence of movements registered for the predetermined function, the user may be prompted to input a password at the touch-screen 102. When the password is detected at the touch-screen 102, the processor 104 is configured to receive the password detected at the touch-screen 102 and determine if the password received corresponds to the master password stored in the database. The processor 104 will enter the command mode and activate the predetermined function if it is determined that the received password corresponds to the master password. In various embodiments, the master password allows the user to bypass the procedure of entering a registered sequence of movements, thereby allowing the user to access the device 100 even if the user is unable to input inputs 110, 112 in either the touch-screen 102 or the motion sensor 106 of the device 100. Further details on how these data are utilised and managed are described in FIG. 2 below.

In an example, in order to activate a predetermined function in a device 100, a user inputs a sequence of inputs 110, 112 at the touch-screen 102 and/or the motion sensor 106 of the device 100. In an embodiment, there is no limit on the number of inputs 110, 112 which can be stringed together to form the sequence of inputs received by the processor 104. The sequence of inputs can be a combination of inputs 110, 112 detected at either the touch-screen 102 or the motion sensor 106 of the device 100 in any order. The data entry mode of the processor 104 may be activated by a touch on the touch-screen 102, or a touch of a button on the keypad or a shake of the device 100 (which will be detected by the motion sensor 106). In an embodiment, upon detecting that a first input 110, 112 is input at the touch-screen 102 or the motion sensor 106, the processor 104 is configured to determine if at least a second input 110, 112 is input at the touch-screen 102 or the motion sensor 106 within a predetermined waiting time period. In an embodiment, the predetermined waiting time period is a time period during which the processor 104 can receive a further input (e.g. a second input) 110, 112 that is detected at either the touch-screen 102 or the motion sensor 106. In an embodiment, the predetermined waiting time period begins at the end of the execution of a preceding input (e.g. a first input) 110, 112. In other words, for the current example, the predetermined waiting time period begins after the processor 104 receives the first input 110, 112 that is detected at either the touch-screen 102 or the motion sensor 106. In an embodiment, the processor 104 restarts the process of initiating a predetermined waiting time period if a second input 110, 112 that is detected at the touch-screen 102 or the motion sensor 106 is received within the predetermined waiting time period. This will continue until no further input is received by the processor 104 within the predetermined waiting time period. At the end of the restarted predetermined waiting time period, the processor 104 will determine if the first and second inputs 110, 112 correspond to a registered sequence of movements 114 associated with a predetermined function of the device 100. Once the processor 104 determines that the first and second inputs 110, 112 correspond to the registered sequence of movements 114 associated with the predetermined function of the device 100, the processor 104 enters into the command mode and activates the predetermined function of the device 100. In an alternative embodiment, if it is determined that the sequence of inputs 110, 112 does not correspond to the registered sequence of movements 114 associated with the predetermined function of the device 100 and the predetermined function is not to be activated, a failure message 116 is sent to and displayed by the touch-screen 102 to notify the user that the predetermined function is not activated. In various embodiments, the predetermined waiting time period can be set by a user of the device or it can be a predetermined waiting time period predefined by a third party (e.g. a manufacturer or a facilitator of payment).

Additionally, the processor 104 may be configured to update the database 108 when a predetermined function is activated in the device 100. This helps to keep a log of usage of the device 100, particularly of the predetermined functions which may have been activated in the device 100. In various embodiments, the processor 104 may send a register to the database 108 after a predetermined function is activated in the device 100. The register includes at least the identity of the predetermined function activated and the time at which the predetermined function is activated in the device 100. The register is then entered into the log of usage which is stored in the database 108. In other words, the log of usage stored in the database 108 includes registers sent by the processor 104 for each predetermined function activated in the device 100. The processor 104 may also be configured to update a sequence of movements 114 registered for a predetermined function of the device 100 stored in the database 108. In an embodiment, updating of the sequence of movements 114 for a predetermined function of the device 100 stored in the database 108 can be achieved using a master password. The master password is a password associated with the device 100 which allows the processor 104 to enter into a command mode to activate a predetermined function. In an embodiment, the predetermined function is to set or reset a registered sequence of movements 114 for a predetermined function in the device 100. In setting or resetting the registered sequence of movements 114 for the predetermined function in the device 100, the processor 104 may enter into the data entry mode to allow a new sequence of inputs to be received by the processor 104 and be updated as the new registered sequence of movements 114 for the predetermined function in the device 100. In an embodiment, a password may be entered at any time while the processor 104 is in the data entry mode. In an embodiment, once the password is received at the processor 104 and it is determined that the password is the same as the master password, the user is allowed to reset or update the sequence of movements 114 registered for any one of the predetermined functions in the device 100. Advantageously, this allows the right owner of the device to activate the predetermined function even if he forgets the sequence of movements that has been registered for the predetermined function.

Figure 2A:
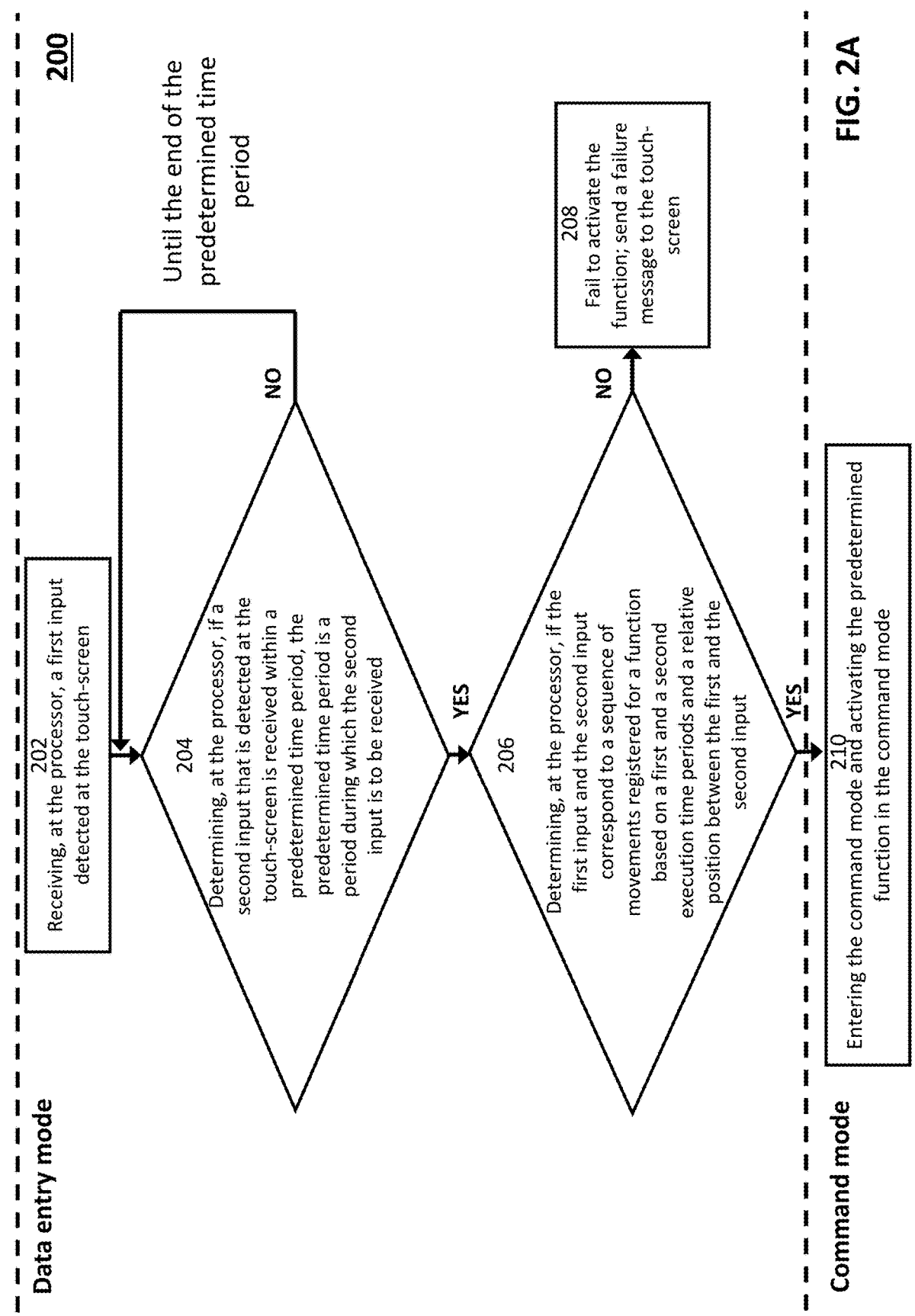

FIG. 2A shows a flow chart 200 illustrating a computer-implemented method for activating a predetermined function in accordance with the first embodiment.

Referring to FIG. 2A, at step 202, a first input 110 is received at the processor 104 when it is detected at the touch-screen 102. The first input 110, 112 is received when the processor 104 is in the data entry mode. In another embodiment, the first input 112 can be received at the processor 104 when it is detected at the motion sensor 106. In an embodiment, an input 110 that is detected at the touch-screen 102 includes at least one of the following gesture types including a swipe, a pinch, a tap, a stroke, a touch and a pattern. In an embodiment, an input 112 that can be detected at the motion sensor 106 includes at least one of the following gesture types including a flip, a rotation, a shake and a translation of the device 100. In an embodiment, the processor 104 enters into the data entry mode by a swipe on the touch-screen 102 or by a press of a predetermined button of the device 100 or as a part of the flow of an application running in the processor. In an embodiment, the first input 110, 112 is received by the processor 104 as direct physical inputs detected at the touch-screen 102 or the motion sensor 106 from a user. In another embodiment, the first input 110, 112 can be received by the processor 104 in the form of remote inputs from the user. The remote inputs can be provided to simulate the physical inputs and may be communicated by any means known to a person skilled in the art, for example wireless communications such as NFC, WIFI, Bluetooth, the public Internet or any other form of viable means of data communications. In specific implementations, the device 100 may be fitted with a wireless communications interface such as a Near Field Communication (NFC) interface. NFC is a set of standards to establish radio communication between devices by bringing them into close proximity such as only a few centimeters. NFC standards cover communication protocols and data exchange formats, and are based on radio-frequency identification (RFID) technology. Alternatively, infra-red technology may also be used. In some situations, communication may be through optical means leveraging the Camera & display interfaces on the device, Bluetooth Low Energy, or even through the audio interface.

At step 204, the processor 104 determines if a second input 110, 112 is received within a predetermined waiting time period, the predetermined waiting time period being a duration during which the second input 110, 112 is to be received. In an embodiment, each of the first and second inputs 110, 112 has a first and second execution time periods, respectively. The first and second execution time periods being the time taken to complete the first and second inputs 110, 112, respectively. In an embodiment, the processor 104 determines a relative position between the first and the second inputs 110, 112 when the second input 110, 112 that is detected at the touch-screen 102 or the motion sensor 106 is received. The relative position being a position of the first input 110, 112 relative to the second input 110, 112. In an embodiment, the predetermined waiting time period is a time period during which the processor 104 can receive the second input 110, 112 from either the touch-screen 102 or the motion sensor 106. In an embodiment, the predetermined waiting time period begins after the processor 104 receives the first input 110, 112 that is detected at the touch-screen 102 in step 202. In an embodiment, the processor 104 reinitiates the predetermined waiting time period at the end of the second execution time period if the second input 110, 112 that is detected at the touch-screen 102 is received within the predetermined waiting time period. This will continue until no further input is received within the predetermined waiting time period. In an embodiment, a failure message is sent to the touch-screen 102 if the second input 110, 112 is not received within the predetermined waiting time period, the failure message identifying that the predetermined function is not activated.

At step 206, when it is determined that the second input 110, 112 is received at the processor 104 within the predetermined waiting time period in step 204, the processor 104 determines if the first and second inputs 110, 112 correspond to a sequence of movements 114 registered for the predetermined function based on the first and second execution time periods and the relative position between the first and second inputs 110, 112. In various embodiments, the determination by the processor 104 if the first and second inputs 110, 112 correspond to the sequence of movements 114 registered for the predetermined function in the device 100 may be based on various properties and characteristics of the first input and the second input which will be illustrated in greater details in FIG. 2B.

Based on the results of step 206, the processor 104 is configured to either send a failure message to be displayed on the touch-screen 102 in step 208 once it is determined that the predetermined function of the device 100 is not to be activated when the first and second inputs 110, 112 do not correspond to the sequence of movements 114 registered for the predetermined function, or to enter the command mode in step 210 when it is determined that the first and second inputs 110, 112 correspond to the sequence of movements 114 registered for the predetermined function, wherein the predetermined function is activated in the command mode.

In an embodiment, at step 208, the processor 104 is configured to send a failure message to the touch-screen 102 to be displayed. In an embodiment, the failure message is sent to the touch-screen 102 if the first and second inputs 110, 112 do not correspond to the sequence of movements 114 registered for the predetermined function, the failure message identifying that the predetermined function is not activated. In an embodiment, the failure message comprises a warning to the user, letting the user know that wrong inputs have been entered, the wrong inputs being a sequence of inputs 110, 112 which do not correspond to the sequence of movements 114. In an embodiment, the processor 104 may be configured to return to step 202 again after the failure message has been sent to the touch-screen 102 so as to receive another first input 110, 112 which may be detected either at the touch-screen 102 or the motion sensor 106. In an embodiment, the failure message may further include a warning to the user, specifying that if wrong inputs are entered a predetermined number of times, the device 100 may be temporarily locked and can only be reset with a master password, the master password being a password that unlocks the device 100 and allows the processor 104 to enter into the command mode. In an embodiment, the master password may be entered any time when the processor 104 is in the data entry mode. An embodiment which includes activating a predetermined function using the master password is described in further details in FIG. 2C.

In an embodiment, at step 210, the processor 104 is configured to enter the command mode when it is determined that the first and second inputs 110, 112 correspond to the sequence of movements 114 registered for the predetermined function of the device 100, wherein the predetermined function is activated in the command mode. In various embodiments, the predetermined function comprises a device unlock, invoking or starting an application, and an initiation and/or completion of a transaction.

Figure 2B:
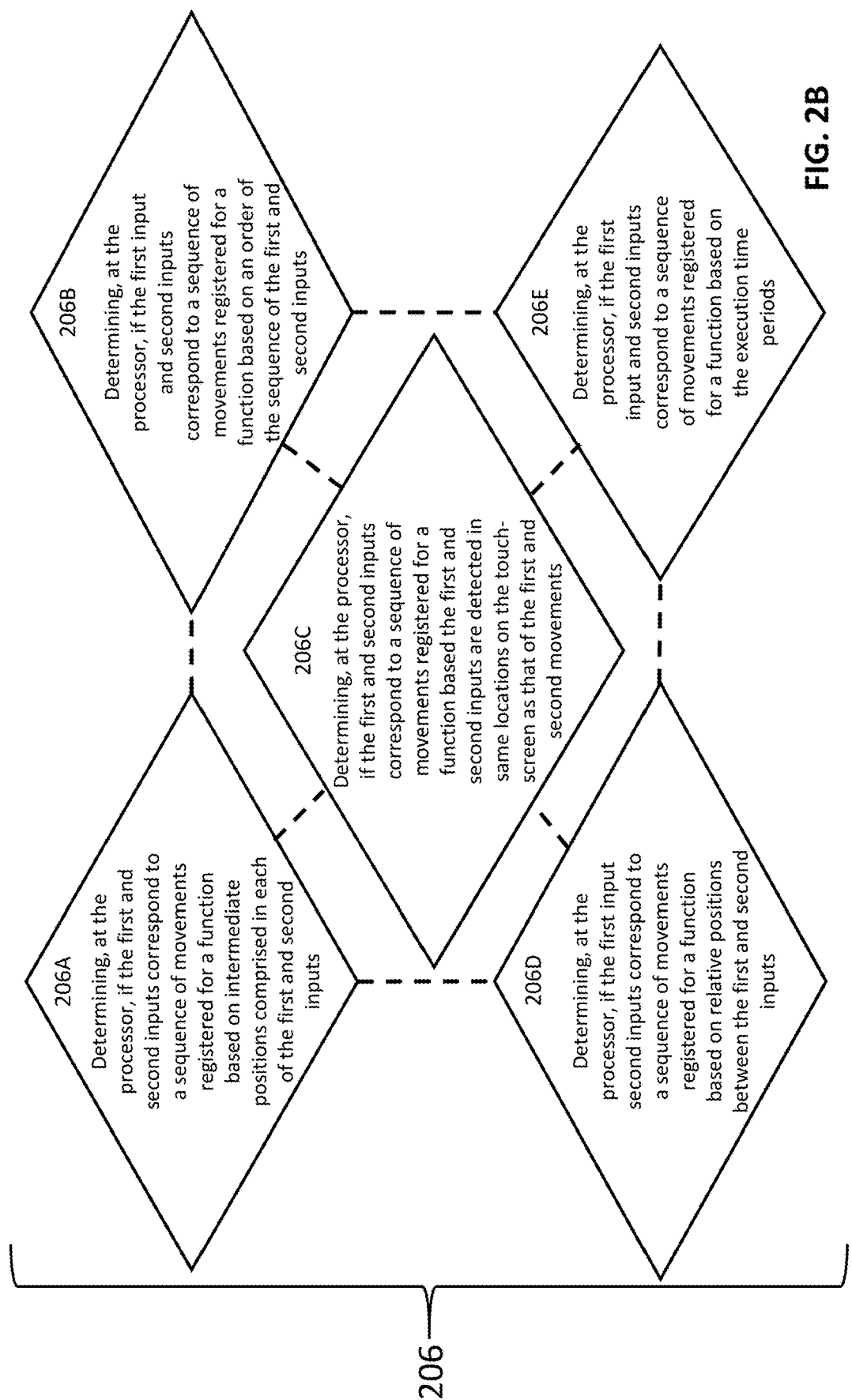

Referring to FIG. 2B, various embodiments of the step 206 in the method for activating the predetermined function in the device 100 are depicted. As discussed previously, the step 206 in determining if the first and second inputs 110, 112 correspond to the sequence of movements 114 registered for the predetermined function can be based on a number of characteristics of the first and second inputs 110, 112.

One of these characteristics used in determining if the first and second inputs correspond to the sequence of movements 114 registered for the predetermined function is an intermediate position comprised in each of the first and second inputs 110, 112 as shown in step 206A. In an embodiment, the intermediate position is a position detected at the touch-screen 102 during detection of each of the first and second inputs 110, 112. In other words, the intermediate position is a position detected at the touch-screen 102 between a first position at which an input 110, 112 is first detected and a last position at which the input 110, 112 is last detected at the end of an execution time period of the input 110, 112. For example, if an input 110 is to be a circle drawn on the touch-screen 102, the first and last positions of the input 110 will likely be the same point and the intermediate position will be at least one position that forms the circumference of the circle. In another example, if an input 112 detected at the motion sensor 106 is to be a 360 degree rotation of the device 100 about a longitudinal axis passing through the middle of the device, then the first and last positions of the device will be the same (i.e. same orientation of the device 100) and the intermediate position will be at least one orientation or position detected between the first position and the last position during the execution time period of the input 112 (e.g. an orientation/position 180 degree rotated about the longitudinal axis from the first orientation/position). In various embodiments, the processor 104 is configured to receive, via the motion sensor 106, the intermediate positions of the input 112 that are detected at the motion sensor 106. In an example, this may be achieved by measuring the angular rate of rotational movement about one or more axes so as to track positions and rotations of the device 100. In various embodiments, the processor 104 in step 206A is configured to receive, via the touch-screen 102 or the motion sensor 106, intermediate positions of the input 110, 112 detected at the touch-screen 102 or the motion sensor 106.

Another of these characteristics used in determining if the first and second inputs 110, 112 correspond to the sequence of movements 114 registered for the predetermined function, as shown in step 206B, is an order in which a sequence of the first and second inputs 110, 112 that are detected at the touch-screen 102 and/or the motion sensor 106 is received at the processor 104. The order in which a sequence of the first and second inputs that are detected at the touch-screen 102 and/or the motion sensor 106 is received at the processor 104 is an important characteristic to determine the uniqueness of a sequence of inputs or movements. For example, if a first input 110 received by the processor 104 that is detected at the touch-screen 102 is a circular trace and a second input 110 received by the processor 104 that is detected at the touch-screen 102 is a rectangular trace, and if a first movement of the sequence of movements is a circular trace and a second movement of the sequence of movements is a rectangular trace, then it is determined by the processor 104 that the first and second inputs correspond to the sequence of movements registered for the predetermined function only if the inputs are received in the order of the first input followed by the second input. As such, the order in which the inputs 110, 112 are received at the processor 104 is an important parameter used to determine if the first and second inputs 110, 112 correspond to the sequence of movements registered for the predetermined function. In an embodiment, it is determined that the first and second inputs 110, 112 correspond to the sequence of movements 114 registered for the predetermined function if the order in which the sequence of the first and second inputs 110, 112 is received at the processor 104 corresponds to that of the first and second movements, given that the first and second inputs are of the same type of gesture as that of the first and second movements respectively. However, in another embodiment, the order of the inputs may not be a parameter to be considered in determining if the first and second inputs correspond to the sequence of movements registered for the predetermined function. In this case, the first and second inputs 110, 112 may correspond to the sequence of movements 114 registered for the predetermined function as long as the first and second inputs 110, 112 are of the same type of gesture as that of the first and second movements, regardless of the order in which the inputs 110, 112 are received by the processor 104. For example, if the first and second movements correspond to a circle of 0.01 m radius and a square of a 0.01 m length, respectively, then the first and second inputs 110 detected at the touch-screen 102 is determined to correspond to the first and second movements as long as two inputs 110 of a circle of 0.01 m radius and a square of 0.01 m length are detected at the touch-screen 102, regardless of the order of the inputs 110.

Figure 5A:
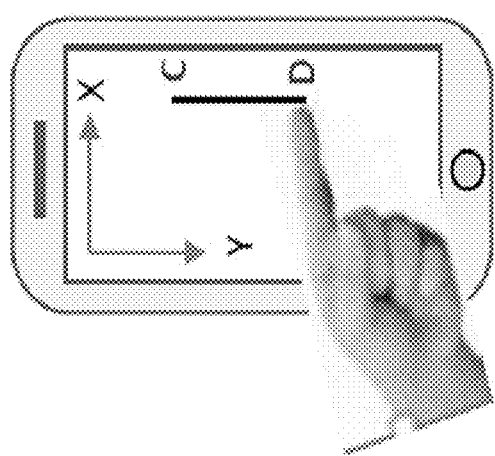
Figure 5B:
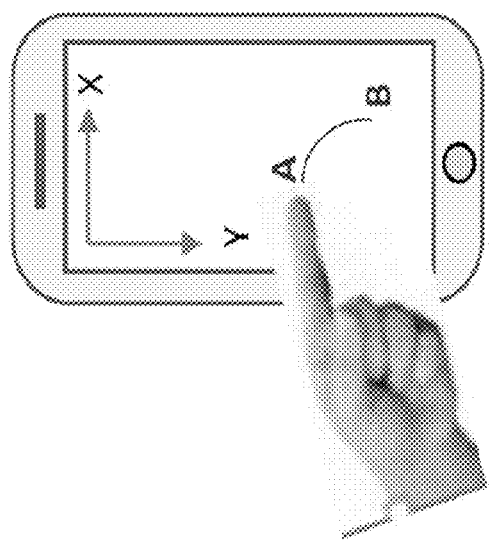
Figure 5C:
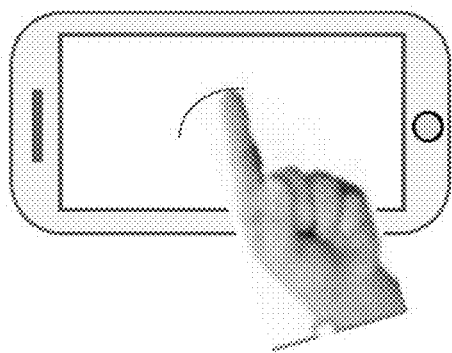
Figure 5D:
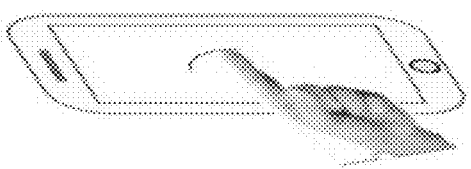
Figure 5E:
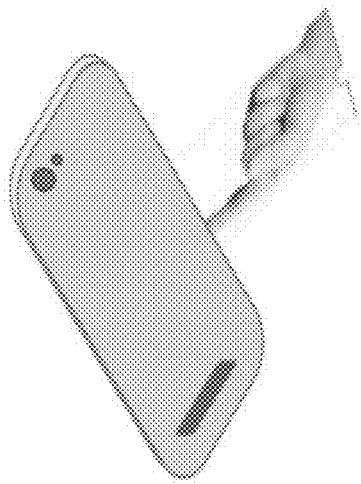
Figure 5F:
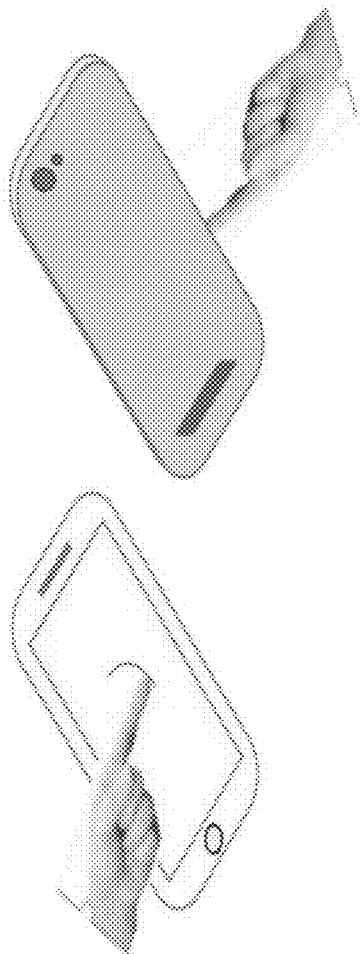

Yet another of these characteristics used in determining if the first and second inputs 110 correspond to the sequence of movements registered for the predetermined function is a location at which each of the first and second inputs 110 is detected at the touch-screen 102 as shown in step 206C. In various embodiments, locations of an input includes a first position at which the input 110, 112 is detected at either the touch-screen 102 or the motion sensor 106, intermediate positions of the input 110, 112 and a last position at which the input 110, 112 is detected at either the touch-screen 102 or the motion sensor 106 at the end of the execution time period of the input 110, 112. In other embodiments, locations of an input 110, 112 includes only the first position at which the input 110, 112 is detected and the last position at which the input 110, 112 is detected at the end of the execution time period of the input. In yet other embodiments, locations of an input 110, 112 comprises only the first position or the last position at which the input 110, 112 is detected. In an embodiment, the locations of the inputs 110, 112 may be defined by absolute positions on the touch-screen 102. The absolute positions on the touch-screen 102 may be exact coordinates defined with respect to a reference point which is pre-set in the device 100. The reference point may be pre-set by the user or a third party (e.g. a manufacturer or a facilitator of payment). This is shown in FIG. 5, where a first gesture of an arc A-B (as shown in FIG. 5A) and a second gesture of a line C-D (as shown in FIG. 5B) can be defined in terms of the X and Y-coordinates on the touch screen. In this case, the coordinates of the first position of the arc A-B can be defined as $(X_A, Y_A)$ and the coordinates of the last position of the arc A-B can be defined as $(X_B, Y_B)$. Similarly, the coordinates of the first and last position of the line C-D can be defined as $(X_C, Y_C)$ and $(X_D, Y_D)$, respectively.

Advantageously, since the processor 104 works on detecting absolute positions, the orientation of the device 100 (for example, whether the device 100 is held upright facing the user or it is kept flat on the table) may not affect the inputting of the inputs 110 at the touch-screen 102.

Examples of different orientations of the device 100 can be seen in FIGS. 5C to 5F. As can be seen in FIGS. 5C to 5F, the inputs 110 can be recognized as long as care is taken to ensure that a screen-rotation function of the device 100 is switched off so that the orientation of the touch-screen 102 is not altered. As such, the locations of inputs 110 may be used as a parameter for determining if the first and second inputs 110 correspond to the sequence of movements registered for a predetermined function in the device 100. In an embodiment, the step of determining, at the processor 104, if the first and second inputs 110 correspond to the sequence of movements 114 registered for the predetermined function further comprises determining, at the processor 104, if the first and second inputs 110 are detected in same locations on the touch-screen 102 as that of the first and second movements, respectively.

Yet another of these characteristics used in determining if the first and second inputs 110, 112 correspond to the sequence of movements 114 registered for the predetermined function is a relative position between the first and second inputs 110, 112 as shown in step 206D. In an embodiment, the step of determining, at the processor 104, if the first and second inputs 110, 112 correspond to the sequence of movements 114 registered for the predetermined function further comprises determining, at the processor 104, if the relative position between the first and second inputs 110, 112 is the same as a relative position between the first and second movements. The relative position being a position of the first input 110, 112 relative to the second input 110, 112. In an embodiment, the relative position between the first and second inputs 110, 112 is a first position at which the second input 110, 112 is detected at the touch-screen 102 or the motion sensor 106 with reference to a last position at which the first input 110, 112 is last detected at the touch-screen 102 or the motion sensor 106. In other words, the relative position defines a displacement vector between the last position at which the first input 110, 112 is last detected and the first position at which the second input 110, 112 is detected. That is to say, in an embodiment, the first and second inputs 110, 112 correspond to the sequence of movements 114 registered for the predetermined function if the displacement vector associated with the relative position between the first and second inputs 110, 112 is the same as that between the first and second movements registered for the predetermined function. It may also be appreciated that in another embodiment, the relative position defines a displacement vector between the first position at which the first input 110, 112 is first detected and the first position at which the second input 110, 112 is detected. In yet another embodiment, the relative position defines a displacement vector between the last position at which the first input 110, 112 is last detected and the last position at which the second input 110, 112 is detected. In these embodiments, the first and second inputs 110, 112 can still be determined to correspond to the sequence of movements 114 registered for the predetermined function if the displacement vector associated with the relative position between the first and second inputs 110, 112 is the same as that between the first and second movements registered for the predetermined function. In various embodiments, a translation of the positions of the first and second inputs 110 detected at the touch-screen while keeping the relative position between the first and second inputs 110 the same will still render the first and second inputs 110 to correspond to the sequence of movements 114 registered for the predetermined function. In other embodiments, this may also be applied to the case when the first input 110 is detected at the touch-screen 102 and the second input 112 is detected at the motion sensor 106. In this case, the orientation of the device 100 may be taken in account in considering the relative position between the first and second inputs if the first input 110 is detected at the touch-screen 102 and the second input 112 is detected at the motion sensor 106. In various embodiments, the relative position may be combined with the intermediate positions in determining if the first and second inputs 110, 112 correspond to the sequence of movements 114 registered for the predetermined function. For example, in an embodiment, the step of determining, at the processor 104, if the first and second inputs 110 that are detected at the touch-screen 102 correspond to the sequence of movements 114 registered for the predetermined function comprises determining if the relative position and the intermediate positions of the first and second inputs 110 are the same as that of first and second movements comprised in the sequence of movements 114, wherein the relative position and the intermediate positions are defined with respective to a predetermined reference position on the touch-screen 102.

Figure 6A:
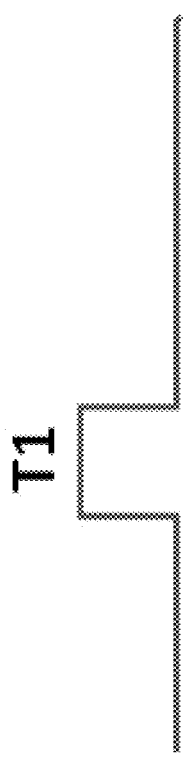
Figure 6B:
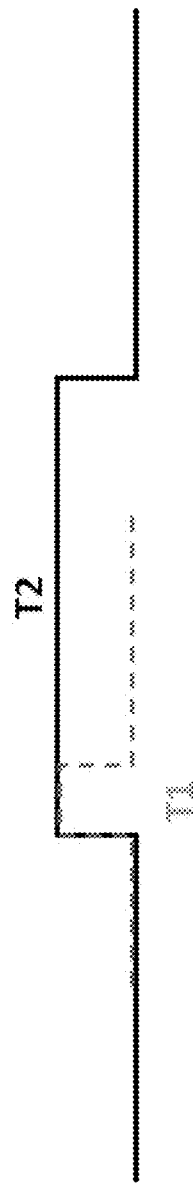
Figure 6C:

Yet another of these characteristics used in determining if the first and second inputs 110, 112 correspond to the sequence of movements 114 registered for the predetermined function is an execution time period of each of the first and second inputs 110, 112 as shown in step 206E. In an embodiment, the execution time period of each of the first and second inputs 110, 112 is defined as the time taken to complete the first and second inputs, respectively. That is, an execution time period of an input 110, 112 is the time taken between a first detection of the input 110, 112 at its first position and the last detection of the input 110, 112 at its last position. This can be illustrated with the examples as shown in FIG. 6A. An example of an input 110 which can be detected at the touch-screen 102 is a short tap. The input 110 detected at the touch-screen 102 is subsequently received at the processor 104 in which the input 110 may be represented as a rectangular pulse signal with pulse duration T1. T1 is the duration of time at which the short tap is detected at the screen (e.g. the duration the screen was touched by the user). In other words, T1 can be considered the execution time period for the input 110 (i.e. the short tap) detected at the touch-screen 102. Alternatively, the tap can be a long tap. An example of a long tap that is detected at the touch-screen 102 and received at the processor 104 is shown in FIG. 6B as a rectangular pulse signal with pulse duration T2. Similarly, T2 is the duration of time at which the long tap is detected at the touch-screen 102 (e.g. the duration the touch-screen 102 was touched by the user). A comparison between the signals received for the short tap and the long tap at the processor 104 is illustrated by the graph in FIG. 6B. As shown, the execution time period of the long tap T2 is greater than the execution time period of the short tap T1. In other words, it takes a longer time to complete the long tap as compared to the short tap. The processor 104 receiving each of the inputs 110 for the short and long taps is configured to decipher the execution time periods for each of the short and long taps. In an embodiment, short taps and long taps as described can also be string together to form a sequence of inputs 110 detected at the touch-screen 102. This is illustrated in FIG. 6C.

Accordingly, the execution time periods of the inputs 110, 112 may be taken into consideration when determining if first and second inputs 110, 112 correspond to a sequence of movements 114 registered for the predetermined function in the device 100. In an embodiment, if the first and second movements registered for the predetermined function is completed in one second and two seconds, respectively, then the first and second inputs correspond to the sequence of movements 114 registered for the predetermined function if the execution time periods of each of the first and second inputs 110, 112 is also one second and two seconds respectively. In an embodiment, the step of determining, at the processor 104, if the first and second inputs 110, 112 correspond to the sequence of movements 114 registered for the predetermined function further comprises determining, at the processor 104, if the first and second execution time periods are the same as a first and a second execution time periods of the first and second movements, respectively.

In all of the above relevant embodiments as shown in FIG. 2B, the inputs 110, 112 received at the processor 104 are determined to correspond to the sequence of movements 114 when the positions and/or the execution time periods of the inputs 110, 112 are the same as that of the sequence of movements 114 registered for the predetermined function. In other embodiments, threshold values for the position as well as the execution time periods may be introduced to give an error margin in which the inputs 110, 112 may still be accepted to correspond to that of the sequence of movements 114 registered for the predetermined function. As such, in an embodiment, the step 206 for determining, at the processor 104, if the first and second inputs 110, 112 correspond to the sequence of movements registered for the predetermined function further comprises determining, at the processor 104, if the differences between the first and second execution time periods with that of the sequence of movements is less than a predetermined time period threshold value. In another embodiment, the step 206 for determining, at the processor 104, if the first and second inputs 110, 112 correspond to the sequence of movements registered for the predetermined function further comprises determining, at the processor 104, if the differences between the relative position of the first and second inputs 110, 112 with that of the sequence of movements 114 is less than a predetermined relative position threshold value. In various embodiments, the predetermined time period threshold value is an absolute difference between the execution time period of each of the first and second movements comprised in the sequence of movements 114 registered for the predetermined function and the corresponding first and second execution time periods of the first and second inputs 110, 112, respectively. In an embodiment, the predetermined time period threshold value is one that is determined by a user at one point in time before inputting the first and second inputs 110, 112 (e.g. one second). In this case, the first and second inputs 110, 112 are determined to correspond to the sequence of movements registered for the predetermined function if the differences between the first and second execution time periods with that of the sequence of movements is less than one second. In other embodiments, the predetermined time period threshold value is a percentage value of the execution time period of each of the first and second movements comprised in the sequence of movements 114 registered for the predetermined function. For example, the predetermined time period threshold value can be set as 10 percent of the execution time period of each of the first and second movements. In other words, if an execution time period of a movement is 10 seconds, then the predetermined time period threshold value which is set as 10 percent will be 1 second. In various embodiments, the predetermined relative position threshold value is an absolute value of a position with reference to the relative position of the first and second movements. For example, an absolute value for the predetermined relative position threshold value can be defined as a circle of a radius of one millimetre centred at the relative position of the first and second movements. In this case, the first and second inputs 110, 112 are determined to correspond to the sequence of movements registered for the predetermined function if the differences between the relative position of the first and second inputs 110, 112 with that of the sequence of movements is within the circle of radius of one millimetre. In other embodiments, the predetermined relative position threshold value is a percentage value of the relative position of the first and second movements comprised in the sequence of movements 114 registered for the predetermined function. For example, a percentage value for the predetermined relative position threshold value can be defined as a circle of a predetermined value centred at the relative position of the first and second movements, the predetermined value being a percentage of the relative position of the first and second movements. In other words, the relative position threshold value can be a percentage of the displacement vector associated with the relative position between the first and second movements registered for the predetermined function. For example, the predetermined relative position threshold value can be set as 10 percent of the relative position of the first and second movements. In other words, if relative position defines a circle with a radius of 1 centimetre, then the predetermined relative position threshold value which is set as 10 percent will be 1 millimetre. In various embodiments, the predetermined position threshold value can also be applied to locations and intermediate positions comprised in the first and second inputs 110, 112.

In the above embodiments for FIG. 2B, the person skilled in the art will be able to combine any of the characteristics as discussed in a logical manner to be used in determining if the first and second inputs 110, 112 correspond to the sequence of movements 114 registered for the predetermined function. For example, in an embodiment, the step of determining, at the processor 104, if the first and second inputs 110, 112 correspond to the sequence of movements 114 registered for the predetermined function comprising determining if the first and second inputs 110, 112 are in the same order sequence as the first and second movements and if the first and second execution time periods are the same as that of the first and second movements, respectively. The relationships between the different embodiments for step 206 are shown as dotted lines in FIG. 2B, where the different characteristics may be combined together to be used in determining if the first and second inputs 110, 112 correspond to the sequence of movements 114 registered for the predetermined function. Moreover, this can also be combined in ways that include the use of the threshold values as discussed above. For example, in an embodiment, the step of determining, at the processor 104, if the first and second inputs 110, 112 correspond to the sequence of movements 114 registered for the predetermined function comprising determining if the relative position between the first and second inputs is the same as the relative position between the first and second movements, and if the differences between the first and second execution time periods with that of the sequence of movements is less than the predetermined time period threshold value. Therefore, as shown in the examples discussed, it would be apparent to the person skilled in the art to combine these characteristics in a varied way so as to achieve a level of sophistication that is desired for the sequence of movements 114 registered to activate the predetermined function. For example, a predetermined function involving a financial transaction may demand more sophistication than a predetermined function involving a camera activation in the device 100. In this case, the user may register a more complex sequence of movements 114 for the predetermined function involving a financial transaction as compared to the predetermined function involving a camera activation. Also, the user may choose to apply more stringent requirements for the inputs 110, 112 such that, for example, the inputs 110, 112 are determined to correspond to the sequence of movements 114 registered for the predetermined function involving a financial transaction only if the inputs 110, 112 are input in the same order with the same gestures and with the same execution time periods. In contrast, the user may decide that the inputs 110, 112 are determined to correspond to the sequence of movements 114 registered for the predetermined function involving a camera activation if the inputs 110, 112 are the same gestures (not necessarily in the same order as that of the sequence of registered movements) and that the differences between the execution time periods of the first and second inputs 110, 112 with that of the sequence of movements 114 is less than a predetermined time period threshold value.

A working example for demonstrating the workings of the present method to activate the predetermined function in the device is depicted below. The advantages of the present method will be apparent in the course of the working example as follows.

Figure 7A:
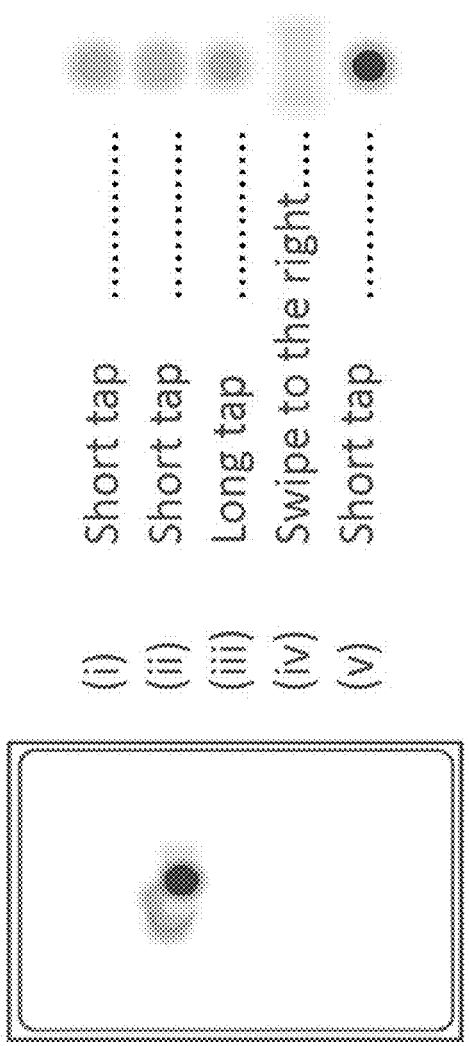
Figure 7C:
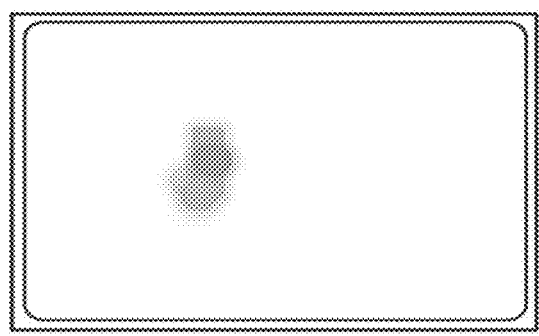
Figure 7B:
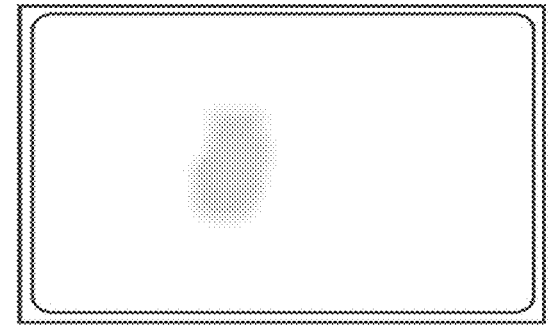

Referring to FIGS. 7A to 7C, the rendering on the screen after a sequence of inputs 110 has been detected at the touch-screen 102 is depicted. For example, let us consider a sequence of inputs 110 that has been detected at the touch-screen 102 as illustrated in FIG. 7A. The sequence of inputs may be used as part of a registration or customization process or as a sequence of movements 114 registered to activate a predetermined function in the device 100. The sequence of inputs 110 may be performed according to steps (i) to (v), where the sequence of inputs 110 comprises (i) a short tap, (ii) a second short tap, (iii) a long tap, (iv) a swipe to the right of the touch-screen 102, and (v) a third short tap in that order, as illustrated. In the current example, positions of the taps have been deliberately offset to demonstrate a typical practical scenario where the taps may not land at the same positions on the touch-screen even if the user intends it to be. FIG. 7B shows the situation wherein the inputs detected at the touch-screen 102 may result in smudges that do not show any outlines. This may be a practical situation where a finger is used to perform the inputs on the touch-screen 102. In this scenario, it will be impossible for a fraudster to understand or decipher the sequence of inputs received at the touch-screen 102. FIG. 7C shows a scenario where some outlines of the inputs may still be visible. This is particularly obvious for the non-overlapping places and more so for the final tap of step (v). This may be a scenario, for example, when the inputs may be entered by lighter touches of a finger. In this case, nevertheless, the tapping sequence may not be decoded by looking at the smudges because time aspect of the inputs 110 (for example, the execution time period of each input in the sequence of inputs) cannot be captured by the smudges alone.

Figure 8A:
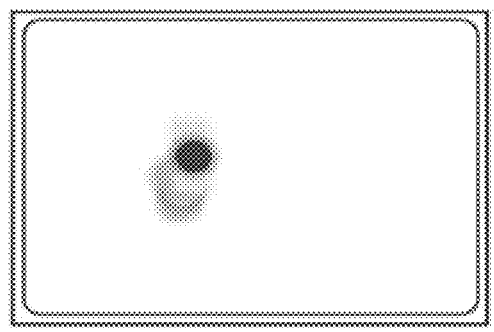
Figure 8B:
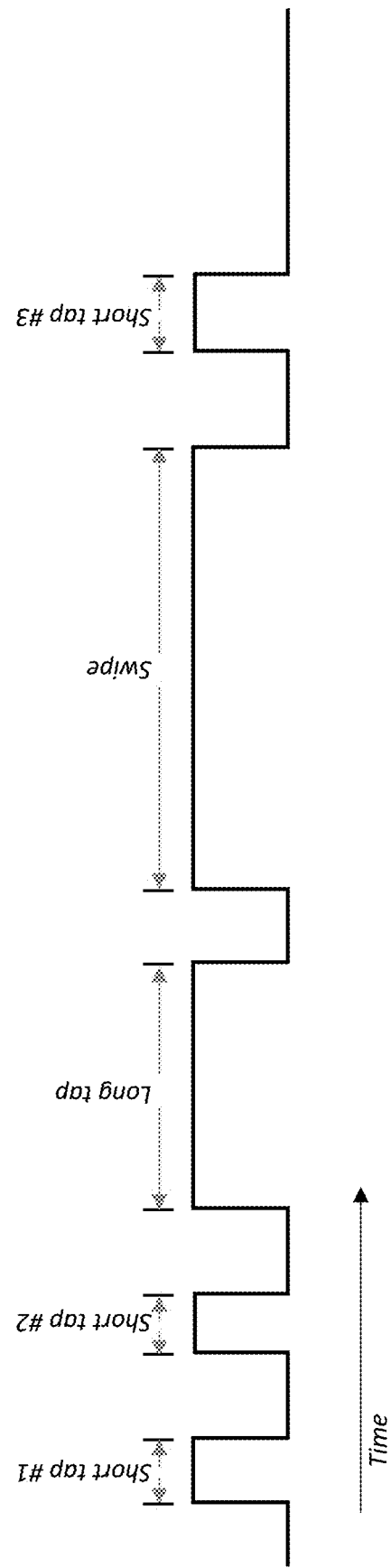

The time aspect of the inputs is illustrated in more details in FIG. 8. FIG. 8, comprising FIG. 8A and FIG. 8B, depicts illustrations of a sequence of inputs detected at the touch-screen 102 and received by the processor 104 of the device 100 as a time domain signal, with FIG. 8A depicting the sequence of inputs detected at the touch-screen 102; and FIG. 8B depicting the time domain signal corresponding to the sequence of inputs in FIG. 8A As shown in FIG. 8B, the time aspect of the sequence of inputs comprises first and second short taps, a long tap, a swipe and a third short tap in that order and received by the processor 104 as a series of time domain signals. The time aspect of this sequence of inputs may not be revealed by the smudges on the touch-screen alone. In other words, it will not be possible for someone looking at the smudges left on the touch-screen 102 after the sequence has been entered to decipher the duration of each tap so as to differentiate between a 'short tap' and a 'long tap'. As such, even if all taps and gestures detected at the touch-screen 102 are non-overlapping and are input at different parts of the touch-screen, a non-authorized user of the device 100 will not be able to figure out the sequence of inputs 110 from the smudges that may be left on the touch-screen 102. Therefore, the present method of activating a predetermined function in the device 100, which considers time aspects of the sequence of inputs 110, is advantageously more secure than available arts discussed in the background.

Moreover, in various embodiments of the above example, the user may enter the sequence of inputs 110 anywhere on the touch-screen 102. This advantageously allows the user to input the sequence of inputs 110 at the touch-screen 102 without needing the user to look at the touch-screen 102. In various embodiments, the user may enter the sequence of inputs 110, 112 in the device 100 when it is in the pocket, in an open drawer, or in a purse. This is in contrast with conventional methods for entering a sequence of inputs where the user has to look at the touch-screen 102 while using the virtual keyboard displayed on the touch-screen 102 to key in a required password or inputting a specific dot pattern on the touch-screen 102. Therefore, the present method is advantageously more user friendly, especially to users who may be visually handicapped. It is also inherently more secure as the gesture can be made without exposing it to an onlooker or a surveillance camera.

Furthermore, the present method for activating a predetermined function in the device 100 can be readily applicable on existing devices as it makes use of existing technology platforms. Therefore, the present method is a simple and cheap implementation for current devices without any other special hardware needs.

Referring to FIG. 2C, a flow chart of additional steps in the method for activating a predetermined function in accordance with the second embodiment is depicted, wherein step 208 of FIG. 2A further comprises requesting for a password when it is determined that the first and second inputs 110 do not correspond to the sequence of movements 114, receiving the password that is detected at the touch-screen 102, determining if the password corresponds to a master password registered to allow the processor 104 to enter the command mode, and entering the command mode when it is determined that the password corresponds to the master password, wherein the pre-determined function is activated in the command mode. The purpose of FIG. 2C is to illustrate another embodiment of the method for activating a predetermined function, where steps 208A, 208B, 208C, 208D and 208E of FIG. 2C are comprised in the method presented in FIG. 2A to allow a user of the device 100 to activate the predetermined function of the device 100 when the master password is entered. This advantageously allows the user to activate the predetermined function in the command mode even though the user may have forgotten the sequence of movements 114 registered for the predetermined function, or may have difficulties, for example due to an injury, inputting a sequence of inputs 110, 112. In various embodiments, the predetermined function associated with the master password allows the user to reset registered sequence of movements 114 stored in the device 100. Although steps 208A to 208E are shown to be steps taken when it is determined that the first and second inputs 110, 112 do not correspond to the sequence of movements 114, in other embodiments, steps 208A to 208E can also be activated at any time when the processor 104 is in the data entry mode. In various embodiments, the steps 208A to 208E may be activated by an option button which may be displayed on the touch-screen 102, where the option button is configured to allow a user to enter the master password so as to activate the predetermined function with the master password.

At step 208A, the processor 104 is configured to request for a password when it is determined that the first and second inputs 110, 112 do not correspond to the sequence of movements 114. In an embodiment, the request for the password is sent by the processor 104 to the touch-screen 102 and is displayed on the touch-screen 102. In various embodiments, a user-defined password waiting time period may be set such that the password is to be entered within the user-defined password waiting time period. The user-defined password waiting time period can be set by the user via the device 100. In other embodiments, the user-defined password waiting time period may be predefined by a third party (e.g. a manufacturer or a facilitator of payment). In various embodiments, if the password is not entered within the user-defined password waiting time period, the processor 104 may time-out and consider it to be an invalid entry. In various embodiments, if a wrong password or an invalid entry is received at the processor 104 three times consecutively, the device may be temporarily locked.

At step 208B, the processor 104 is configured to receive the password that is detected at the touch-screen 102. In various embodiments, the password may be a personal identification number (PIN). The PIN may include either numeric only PIN or alphanumeric PIN. The PIN may be entered in the device 100 through a physical keyboard or a virtual keyboard displayed on the touch-screen 102. In various embodiments, the password also includes dot-patterns. The dot-patterns are user-defined patterns comprising traces on a matrix of dots that may be displayed on the touch-screen 102. In various embodiments, the password includes biometric identifications such as a fingerprint. In various embodiments, the touch-screen 102 may be configured to read a fingerprint from a designated area on the touch-screen 102.

At step 208C, the processor 104 is configured to determine if the password received in step 208B corresponds to a master password registered to allow the processor 104 to enter the command mode. In various embodiments, the master password is registered and stored in database 108 to allow the user to bypass the procedure of entering a sequence of inputs 110, 112 which correspond to a registered sequence of movements 114, so as to allow the user to have access to operations of the device 100. In an embodiment, the master password allows the processor 104 to enter the command mode and thereby allows the predetermined function to be activated in the device 100. In various embodiments, the master password may be a personal identification number (PIN). The PIN may include either numeric only PIN or alphanumeric PIN. The PIN may be entered in the device 100 through a physical keyboard or a virtual keyboard displayed on the touch-screen 102. In various embodiments, the master password can also include dot-patterns. The dot-patterns are user-defined patterns comprising traces on a matrix of dots that may be displayed on the touch-screen 102. In various embodiments, the master password includes biometric identifications such as a fingerprint. In various embodiments, the touch-screen 102 may be configured to read a fingerprint from a designated area of the touch-screen 102.

At step 208D, the processor 104 is configured to send a failure message to be displayed on the touch-screen 102 once it is determined that the password does not correspond to the master-password registered. In various embodiments, the processor 104 may be directed to step 208A to request a password to be entered again after the failure message is displayed. In this case, the processor 104 may run through steps 208A to 208C again. In various embodiments, the processor 104 is configured to temporarily lock the device when the password is determined to have not corresponded to the master-password for a predetermined number of times. In an embodiment, the predetermined number of times is three. That is, the device 100 will be temporarily locked if a wrong password is received by the processor 104 three times consecutively.

At step 208E, the processor 104 is configured to enter the command mode when the password corresponds to the master password, wherein the pre-determined function is activated in the command mode. In various embodiments, the predetermined function comprises a device unlock, an application and a transaction. In various embodiments, the pre-determined function may also include updating the sequence of movements 114 registered for the pre-determined function.

Figure 3:
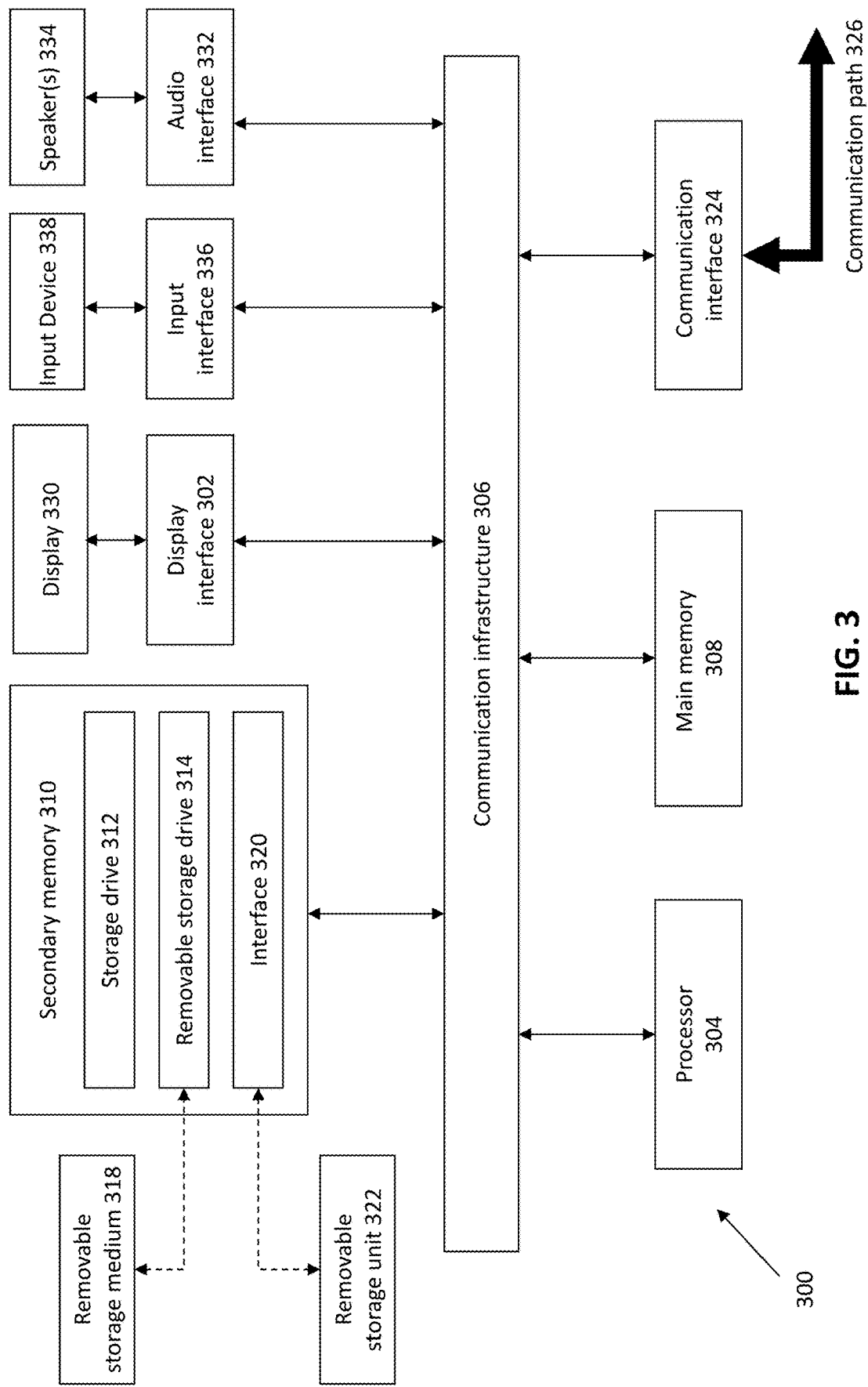
FIG. 3 depicts a schematic diagram of a computer system suitable for use in executing the methods depicted in FIG. 2.

FIG. 3 depicts an exemplary computer/computing device 300, hereinafter interchangeably referred to as a computer system 300, where one or more such computing devices 300 may be used to facilitate execution of the above-described method for activating a function. In addition, one or more components of the computer system 300 may be used to realize a computer. The following description of the computing device 300 is provided by way of example only and is not intended to be limiting.

As shown in FIG. 3, the example computing device 300 includes a processor 304 for executing software routines. Although a single processor is shown for the sake of clarity, the computing device 300 may also include a multi-processor system. The processor 304 is connected to a communication infrastructure 306 for communication with other components of the computing device 300. The communication infrastructure 306 may include, for example, a communications bus, cross-bar, or network.

The computing device 300 further includes a main memory 308, such as a random access memory (RAM), and a secondary memory 310. The secondary memory 310 may include, for example, a storage drive 312, which may be a hard disk drive, a solid state drive or a hybrid drive and/or a removable storage drive 314, which may include a magnetic tape drive, an optical disk drive, a solid state storage drive (such as a USB flash drive, a flash memory device, a solid state drive or a memory card), or the like. The removable storage drive 314 reads from and/or writes to a removable storage medium 318 in a well-known manner. The removable storage medium 318 may include magnetic tape, optical disk, non-volatile memory storage medium, or the like, which is read by and written to by removable storage drive 314. As will be appreciated by persons skilled in the relevant art(s), the removable storage medium 318 includes a computer readable storage medium having stored therein computer executable program code instructions and/or data.

In an alternative implementation, the secondary memory 310 may additionally or alternatively include other similar means for allowing computer programs or other instructions to be loaded into the computing device 300. Such means can include, for example, a removable storage unit 322 and an interface 320. Examples of a removable storage unit 322 and interface 320 include a program cartridge and cartridge interface (such as that found in video game console devices), a removable memory chip (such as an EPROM or PROM) and associated socket, a removable solid state storage drive (such as a USB flash drive, a flash memory device, a solid state drive or a memory card), and other removable storage units 322 and interfaces 320 which allow software and data to be transferred from the removable storage unit 322 to the computer system 300.

The computing device 300 also includes at least one communication interface 324. The communication interface 324 allows software and data to be transferred between computing device 300 and external devices via a communication path 326. In various embodiments of the inventions, the communication interface 324 permits data to be transferred between the computing device 300 and a data communication network, such as a public data or private data communication network. The communication interface 324 may be used to exchange data between different computing devices 300 which such computing devices 300 form part of an interconnected computer network. Examples of a communication interface 324 can include a modem, a network interface (such as an Ethernet card), a communication port (such as a serial, parallel, printer, GPIB, IEEE 1394, RJ25, USB), an antenna with associated circuitry and the like. The communication interface 324 may be wired or may be wireless. Software and data transferred via the communication interface 324 are in the form of signals which can be electronic, electromagnetic, optical or other signals capable of being received by communication interface 324. These signals are provided to the communication interface via the communication path 326.

As shown in FIG. 3, the computing device 300 further includes a display interface 302 which performs operations for rendering images to an associated display 330 and an audio interface 532 for performing operations for playing audio content via associated speaker(s) 534. In various embodiments, the associated display 330 includes a touch-screen. Moreover, the computer device 300 may include an input interface 336 which allows inputs to be received by the computing device 300 via an input device 338. In various embodiments, the input device includes a touch panel, keys or buttons operationally connected to the computing device 300, and a wired or wireless keyboard. In various embodiments, the input device 338, such as a touch panel overlaid on the touch-screen, allows one to input gestures, taps and alphanumeric data through a virtual keyboard of the touch panel.

As used herein, the term "computer program product" may refer, in part, to removable storage medium 318, removable storage unit 322, a hard disk installed in storage drive 312, or a carrier wave carrying software over communication path 326 (wireless link or cable) to communication interface 324. Computer readable storage media refers to any non-transitory, non-volatile tangible storage medium that provides recorded instructions and/or data to the computing device 300 for execution and/or processing. Examples of such storage media include magnetic tape, CD-ROM, DVD, Blu-Ray™ Disc, a hard disk drive, a ROM or integrated circuit, a solid state storage drive (such as a USB flash drive, a flash memory device, a solid state drive or a memory card), a hybrid drive, a magneto-optical disk, or a computer readable card such as a SD card and the like, whether or not such devices are internal or external of the computing device 300. Examples of transitory or non-tangible computer readable transmission media that may also participate in the provision of software, application programs, instructions and/or data to the computing device 300 include radio or infra-red transmission channels as well as a network connection to another computer or networked device, and the Internet or Intranets including e-mail transmissions and information recorded on Websites and the like.

The computer programs (also called computer program code) are stored in main memory 308 and/or secondary memory 310. Computer programs can also be received via the communication interface 324. Such computer programs, when executed, enable the computing device 300 to perform one or more features of embodiments discussed herein. In various embodiments, the computer programs, when executed, enable the processor 304 to perform features of the above-described embodiments. Accordingly, such computer programs represent controllers of the computer system 300.

Software may be stored in a computer program product and loaded into the computing device 300 using the removable storage drive 314, the storage drive 312, or the interface 320. Alternatively, the computer program product may be downloaded to the computer system 300 over the communications path 326. The software, when executed by the processor 304, causes the computing device 300 to perform functions of embodiments described herein.

At least one of the removable storage medium 318, removable storage unit 322, and hard disk installed in storage drive 312 comprises a computer program, the computer program comprising instructions that, when executed by the processor 304 cause the computing device 300 of FIG. 3 to activate a predetermined function in the device 300, the device having at least a touch-screen (e.g. input device 338) coupled to the processor 304 (e.g. via input interface 336), the device 300 being operable in a data entry mode and a command mode, the data entry mode being one in which the processor 304 is configured to receive inputs detected at the touch-screen 338 and the command mode being one in which the processor 304 is configured to activate a function, wherein, in the data entry mode, the computing device 300 is caused to (A) receive a first input that is detected at the touch-screen 338; (B) determine if a second input is received within a predetermined waiting time period, the predetermined waiting time period being a duration during which the second input is to be received, each of the first and second inputs having a first and second execution time periods and a position relative to the other input, the first and second execution time periods being the time taken to execute the first and second inputs, respectively; (C) determine if the first and second inputs correspond to a sequence of movements registered for the predetermined function based on the first and second execution time periods and the relative position between the first and second inputs when it is determined that the second input is received within the predetermined waiting time period; and (D) enter the command mode when it is determined that the first and second inputs correspond to the sequence of movements registered for the predetermined function, wherein the predetermined function is activated in the command mode.

Step (C) may be performed by determining if the first and second inputs correspond to the sequence of movements registered for the predetermined function based on intermediate positions comprised in each of the first and second inputs, the intermediate positions being positions detected at the touch-screen during detection of the first input and the second input. Where the first and second inputs comprise intermediate positions, step (C) may be performed by determining if the relative position and the intermediate positions are the same as a first movement and a second movement comprised in the sequence of movements, wherein the relative position and the intermediate positions are defined with respective to a predetermined reference position on the touch-screen. Wherein the sequence of movements comprises a first and second movements, step (C) may be performed by determining if the first and second inputs are in the same order sequence as the first and second movements, wherein the first and second inputs are of the same type of gesture as the first and second movements, respectively. Step (C) may also be performed by determining if the relative position between the first and second inputs is the same as a relative position between the first and second movements. Moreover, step (C) may also be performed by determining if the first and second execution time periods are the same as a first and a second execution time periods of the first and second movements, respectively. Furthermore, step (C) may be performed by determining if the difference between the first and second execution time periods with that of the sequence of movements is less than a predetermined time period threshold value.

Still furthermore, step (C) may also be performed by requesting for a password when it is determined that the first and second inputs do not correspond to the sequence of movements; receiving the password that is detected at the touch-screen; determining, at the processor, if the password corresponds to a master password registered to allow the processor to enter the command mode; and entering the command mode when it is determined that the password corresponds to the master password, wherein the predetermined function is activated in the command mode.

It is to be understood that the embodiment of FIG. 3 is presented merely by way of example. Therefore, in some embodiments one or more features of the computing device 300 may be omitted. Also, in some embodiments, one or more features of the computing device 300 may be combined together. Additionally, in some embodiments, one or more features of the computing device 300 may be split into one or more component parts.

Figure 4:
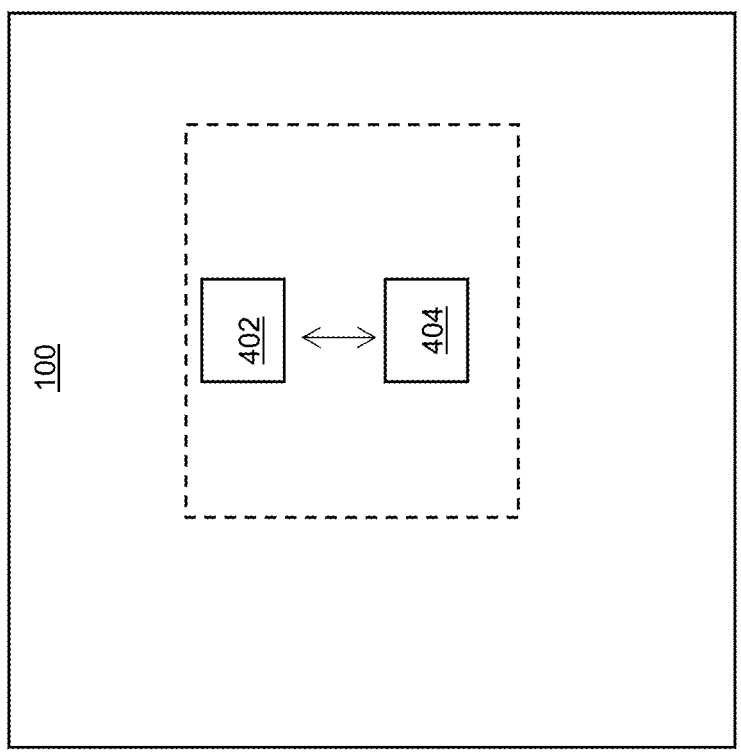
FIG. 4 depicts an exemplary computing device to realise a device 100 shown in FIG. 1.

In an implementation, the device 100 may be generally described as a physical device comprising at least one processor 402 and at least one memory 404 including computer program code. The at least one memory 404 and the computer program code are configured to, with the at least one processor 402, cause the physical device to perform the operations described in FIG. 2. An example of the device is shown in FIG. 4.

For example, the method of FIG. 2 may be implemented as software and stored in a non-transitory fashion in the secondary memory 310 or the removable storage drive 314 of the computer device 300.

It will be appreciated by a person skilled in the art that numerous variations and/or modifications may be made to the present invention as shown in the specific embodiments without departing from the spirit or scope of the invention as broadly described. For example, it will be appreciated that any type of secure wireless connection, such as Wi-Fi, can be used in alternate embodiments to implement the method, as can various embodiments of hardwired or direct connections. Some modifications, e.g. adding an access point, changing the log-in routine, etc. may be considered and incorporated. The present embodiments are, therefore, to be considered in all respects to be illustrative and not restrictive.

What is claimed:

1. A computer-implemented method for activating a predetermined function in a device, the device having at least a touch-screen coupled to a processor, the device being operable in a data entry mode and a command mode, the data entry mode being one in which the processor is configured to receive inputs detected at the touch-screen and the command mode being one in which the processor is configured to activate a function, the method comprising:
    in the data entry mode,
        receiving, at the processor, a first input that is detected at the touch-screen;
        determining, at the processor, that a second input is received within a predetermined waiting time period, the predetermined waiting time period being a duration during which the second input is to be received, each of the first and second inputs having a first and second execution time periods and a position relative to the other input, the first and second execution time periods being the time taken to execute the first and second inputs, respectively;
        determining, at the processor, in response to the determination that the second input is received within the predetermined waiting time period, that the first and second inputs correspond to a sequence of movements registered for the predetermined function based on the first and second execution time periods and the relative position between the first and second inputs; and
    entering the command mode in response to the determination that the first and second inputs correspond to the sequence of movements registered for the predetermined function, wherein the predetermined function is activated in the command mode.

2. The method of claim 1, wherein the step of determining, at the processor, that the first and second inputs correspond to the sequence of movements registered for the predetermined function further comprises determining, at the processor, that the first and second inputs correspond to the sequence of movements registered for the predetermined function based on intermediate positions comprised in each of the first and second inputs, the intermediate positions being positions detected at the touch-screen during detection of the first input and the second input.

3. The method of claim 2, wherein the step of determining, at the processor, that the first and second inputs correspond to the sequence of movements registered for the predetermined function further comprises determining that the relative position and the intermediate positions are the same as a first movement and a second movement comprised in the sequence of movements, wherein the relative position and the intermediate positions are defined with respective to a predetermined reference position on the touch-screen.

4. The method of claim 1, wherein the sequence of movements comprises a first and a second movements, and wherein the step of determining, at the processor, that the first and second inputs correspond to the sequence of movements registered for the predetermined function further comprises determining that the first and second inputs are in the same order sequence as the first and second movements, wherein the first and second inputs are of the same type of gesture as the first and second movements, respectively.

5. The method of claim 4, wherein the step of determining, at the processor, that the first and second inputs correspond to the sequence of movements registered for the predetermined function further comprises determining, at the processor, that the relative position between the first and second inputs is the same as a relative position between the first and second movements.

6. The method of claim 4, wherein the step of determining, at the processor, that the first and second inputs correspond to the sequence of movements registered for the predetermined function further comprises determining, at the processor, that the first and second execution time periods are the same as a first and a second execution time periods of the first and second movements, respectively.

7. The method of claim 4, wherein the step of determining, at the processor, that the first and second inputs correspond to the sequence of movements registered for the predetermined function further comprises determining, at the processor, that the first and second inputs are detected in same locations at the touch-screen as that of the first and second movements, respectively.

8. The method of claim 1, wherein the step of determining, at the processor, that the first and second inputs correspond to the sequence of movements registered for the predetermined function further comprises determining, at the processor, that the difference between the first and second execution time periods with that of the sequence of movements is less than a predetermined time period threshold value.

9. The method of claim 1, wherein the step of determining, at the processor, that the first and second inputs correspond to the sequence of movements registered for the predetermined function further comprises determining, at the processor, that the difference between the relative position with that of the sequence of movements is less than a predetermined relative position threshold value.

10. The method of claim 1, wherein the step of determining, at the processor, that the second input is received within the predetermined waiting time period, further comprises sending a failure message to the touch-screen in a case where the second input is not received within the predetermined waiting time, the failure message identifying that the predetermined function is not activated.

11. The method of claim 1, wherein the step of determining, at the processor, that the first and second inputs correspond to the sequence of movements registered for the predetermined function further comprising:
    requesting for a password in response to the determination that the first and second inputs do not correspond to the sequence of movements;
    receiving, at the processor, the password that is detected at the touch-screen;
    determining, at the processor, that the password corresponds to a master password registered to allow the processor to enter the command mode; and entering the command mode in response to the determination that the password corresponds to the master password, wherein the predetermined function is activated in the command mode.

12. An apparatus for activating a predetermined function associated with a financial transaction, the apparatus comprising:
at least one processor;
at least a touch-screen coupled to the at least one processor; and
at least one memory including computer program code;
the apparatus being operable in a data entry mode and a command mode, the data entry mode being one in which the processor is configured to receive inputs detected at the touch-screen and the command mode being one in which the processor is configured to activate a financial transaction function, the at least one memory and the computer program code configured to, with at least one processor, causes the apparatus at least to:
in the data entry mode,
receive, at the processor, a first input that is detected at the touch-screen;
determine, at the processor, whether a second input is received within a predetermined waiting time period, the predetermined waiting time period being a duration during which the second input is to be received, each of the first and second inputs having a first and second execution time periods and a position relative to the other input, the first and second execution time periods being the time taken to execute the first and second inputs, respectively;
determine, at the processor, in response to the determination that the second input is received within the predetermined waiting time period, whether the first and second inputs correspond to a sequence of movements registered for the predetermined function associated with the financial transaction based on the first and second execution time periods and the relative position between the first and second inputs; and
enter the command mode in response to the determination that the first and second inputs correspond to the sequence of movements registered for the predetermined function associated with the financial transaction, wherein the predetermined function is activated in the command mode.

13. The apparatus according to claim 12, wherein the at least one memory and the computer program code is configured with the at least one processor to determine, at the processor, whether the first and second inputs correspond to the sequence of movements registered for the predetermined function is further configured to determine, at the processor, whether the first and second inputs correspond to the sequence of movements registered for the predetermined function based on intermediate positions comprised in each of the first and second inputs, the intermediate positions being positions detected at the touch-screen during detection of the first input and the second input.

14. The apparatus according to claim 13, wherein the at least one memory and the computer program code is configured with the at least one processor to determine, at the processor, whether the first and second inputs correspond to the sequence of movements registered for the predetermined function is further configured to determine whether the relative position and the intermediate positions are the same as a first movement and a second movement comprised in the sequence of movements, wherein the relative position and the intermediate positions are defined with respective to a predetermined reference position on the touch-screen.

15. The apparatus according to claim 12, wherein the sequence of movements comprises a first and a second movements, and wherein the at least one memory and the computer program code is configured with the at least one processor to determine, at the processor, whether the first and second inputs correspond to the sequence of movements registered for the predetermined function is further configured to determine whether the first and second inputs are in the same order sequence as the first and second movements, wherein the first and second inputs are of the same type of gesture as the first and second movements, respectively.

16. The apparatus according to claim 15, wherein the at least one memory and the computer program code is configured with the at least one processor to determine, at the processor, whether the first and second inputs correspond to the sequence of movements registered for the predetermined function is further configured to determine, at the processor, whether the relative position between the first and second inputs is the same as a relative position between the first and second movements.

17. The apparatus according to claim 15, wherein the at least one memory and the computer program code is configured with the at least one processor to determine, at the processor, whether the first and second inputs correspond to the sequence of movements registered for the predetermined function is further configured to determine, at the processor, whether the first and second execution time periods are the same as a first and a second execution time periods of the first and second movements, respectively.

18. The apparatus according to claim 15, wherein the at least one memory and the computer program code is configured with the at least one processor to determine, at the processor, whether the first and second inputs correspond to the sequence of movements registered for the predetermined function is further configured to determine, at the processor, whether the first and second inputs are detected in same locations on the touch-screen as that of the first and second movements, respectively.

19. The apparatus according to claim 12, wherein the at least one memory and the computer program code is configured with the at least one processor to determine, at the processor, whether the first and second inputs correspond to the sequence of movements registered for the predetermined function is further configured to determine, at the processor, whether the differences between the first and second execution time periods with that of the sequence of movements is less than a predetermined time period threshold value.

20. The apparatus according to claim 12, wherein the at least one memory and the computer program code is configured with the at least one processor to determine, at the processor, whether the first and second inputs correspond to the sequence of movements registered for the predetermined function is further configured to determine, at the processor, whether the differences between the relative position with that of the sequence of movements is less than a predetermined relative position threshold value.

21. The apparatus according to claim 12, wherein the at least one memory and the computer program code is configured with the at least one processor to determine, at the processor, whether the second input is received within the predetermined waiting time period, is further configured to send a failure message to the touch-screen in a case where the second input is not received within the predetermined waiting time, the failure message identifying that the predetermined function is not activated.

22. The apparatus according to claim 12, wherein the at least one memory and the computer program code is configured with the at least one processor to determine, at the processor, whether the first and second inputs correspond to the sequence of movements registered for the predetermined function is further configured to:
- request for a password in response to the determination that the first and second inputs do not correspond to the sequence of movements;
- receive, at the processor, the password that is detected at the touch-screen;
- determine, at the processor, whether the password corresponds to a master password registered to allow the processor to enter the command mode; and
- enter the command mode in response to the determination that the password corresponds to the master password, wherein the predetermined function is activated in the command mode.

23. The apparatus according to claim 12, wherein the predetermined function comprises a device unlock, an application and a transaction.

24. The apparatus according to claim 12, wherein the second input comprises a flip, a rotation, a shake and a translation of the device.

25. The apparatus according to claim 12, wherein each of the first and second inputs detected at the touch screen comprises a swipe, a pinch, a tap, a stroke, a touch and a pattern.

* * * * *